US012771233B2

(12) United States Patent
Kiguchi et al.

(10) Patent No.: US 12,771,233 B2
(45) Date of Patent: Oct. 20, 2026

(54) DRIVING DEVICE AND POWER CONVERTER

(71) Applicant: FUJI ELECTRIC CO., LTD., Kanagawa (JP)

(72) Inventors: Ryoga Kiguchi, Tokyo (JP); Hiromu Takubo, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 259 days.

(21) Appl. No.: 18/613,761

(22) Filed: Mar. 22, 2024

(65) Prior Publication Data

US 2024/0356430 A1 Oct. 24, 2024

(30) Foreign Application Priority Data

Apr. 19, 2023 (JP) ................................ 2023-068811

(51) Int. Cl.
*H02M 1/088* (2006.01)
*H02M 1/38* (2007.01)
*H02M 7/537* (2006.01)

(52) U.S. Cl.
CPC ............ *H02M 1/088* (2013.01); *H02M 1/38* (2013.01); *H02M 7/537* (2013.01)

(58) Field of Classification Search
None
See application file for complete search history.

(56) References Cited

FOREIGN PATENT DOCUMENTS

JP 2017-051049 3/2017
JP 2017051049 A * 3/2017

OTHER PUBLICATIONS

Tsuyoshi Funaki et al., A study on performance degradation of SiC MOSFET for burn-in test of body diode, Jul. 2013, 2013 4th IEEE International Symposium on Power Electronics for Distributed Generation Systems (PEDG), DOI: 10.1109/PEDG.2013.6785593 (Year: 2013).*

Xuning Zhang et al., In Depth Analysis of Driving Loss and Driving Power Supply Structure for SiC MOSFETs, 2019 IEEE Applied Power Electronics Conference and Exposition (APEC), May 27, 2019, DOI: 10.1109/APEC.2019.8722272 (Year: 2019).*

* cited by examiner

*Primary Examiner* — Crystal L Hammond
*Assistant Examiner* — Seung Ho Choi
(74) *Attorney, Agent, or Firm* — IPUSA, PLLC

(57) ABSTRACT

A driving device includes a first circuit switching between connecting and not connecting a first control line to a first positive power supply line, a second circuit switching between connecting or not connecting the first control line to a first negative power supply line, a third circuit switching between connecting and not connecting the first control line to a first reference line, a first control circuit operating the third circuit so that the first control line is connected to the first reference line during a dead time, a fifth circuit switching between connecting and not connecting a second control line to a second negative power supply line, a sixth circuit switching between connecting and not connecting the second control line to a second reference line, and a second control circuit operating the sixth circuit so that the second control line is connected to the second reference line.

12 Claims, 14 Drawing Sheets

DRIVING DEVICE AND POWER CONVERTER

CROSS-REFERENCE TO RELATED APPLICATIONS

This application is based upon and claims priority to Japanese Patent Application No. 2023-068811, filed on Apr. 19, 2023, the entire contents of which are incorporated herein by reference.

FIELD

The present disclosure relates to driving devices and power converters.

BACKGROUND

Conventionally, there is a power conversion circuit having two series-connected switching elements that are connected in parallel to a DC power supply. In such a power conversion circuit, it is known to bias both gate voltages of the two switching elements in a negative direction, so that the two switching elements will not turn on simultaneously during a dead time period, as proposed in Japanese Laid-Open Patent Publication No. 2017-51049.

A switching element, such as a SiC-MOSFET or the like, has a problem in that characteristics thereof deteriorate when a current flows through a body diode. When a driving method proposed in Japanese Laid-Open Patent Publication No. 2017-51049 is applied to the driving of such a switching element, a current flows through the body diode of the switching element during the dead time, and the deterioration of the switching element may progress.

SUMMARY

The present disclosure provides a driving device and a power converter including the driving device, that can prevent deterioration of a switching element.

According to one aspect of the present disclosure, a driving device is configured to alternately switch a first switching element and a second switching element that are coupled in series, with a dead time in between and during which the first switching element and the second switching element are simultaneously turned off, and includes a first drive circuit configured to drive the first switching element; and a second drive circuit configured to drive the second switching element, wherein the first drive circuit includes a first control line electrically connected to a control electrode of the first switching element, a first positive power supply line set to a first positive power supply voltage, a first negative power supply line set to a first negative power supply voltage, a first reference line electrically connected to a first main electrode of the first switching element, and set to a first intermediate voltage higher than the first negative power supply voltage and lower than a threshold voltage of the first switching element, a first switching circuit configured to switch between electrically connecting and not electrically connecting the first control line to the first positive power supply line, a second switching circuit configured to switch between electrically connecting or not electrically connecting the first control line to the first negative power supply line, a third switching circuit configured to switch between electrically connecting and not electrically connecting the first control line to the first reference line, and a first control circuit configured to operate the third switching circuit so that the first control line is electrically connected to the first reference line during the dead time, and the second drive circuit includes a second control line electrically connected to a control electrode of the second switching element, a second positive power supply line set to a second positive power supply voltage, a second negative power supply line set to a second negative power supply voltage, a second reference line electrically connected to a first main electrode of the second switching element, and set to a second intermediate voltage higher than the second negative power supply voltage and lower than a threshold voltage of the second switching element, a fourth switching circuit configured to switch between electrically connecting and not electrically connecting the second control line to the second positive power supply line, a fifth switching circuit configured to switch between electrically connecting and not electrically connecting the second control line to the second negative power supply line, a sixth switching circuit configured to switch between electrically connecting and not electrically connecting the second control line to the second reference line, and a second control circuit configured to operate the sixth switching circuit so that the second control line is electrically connected to the second reference line.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
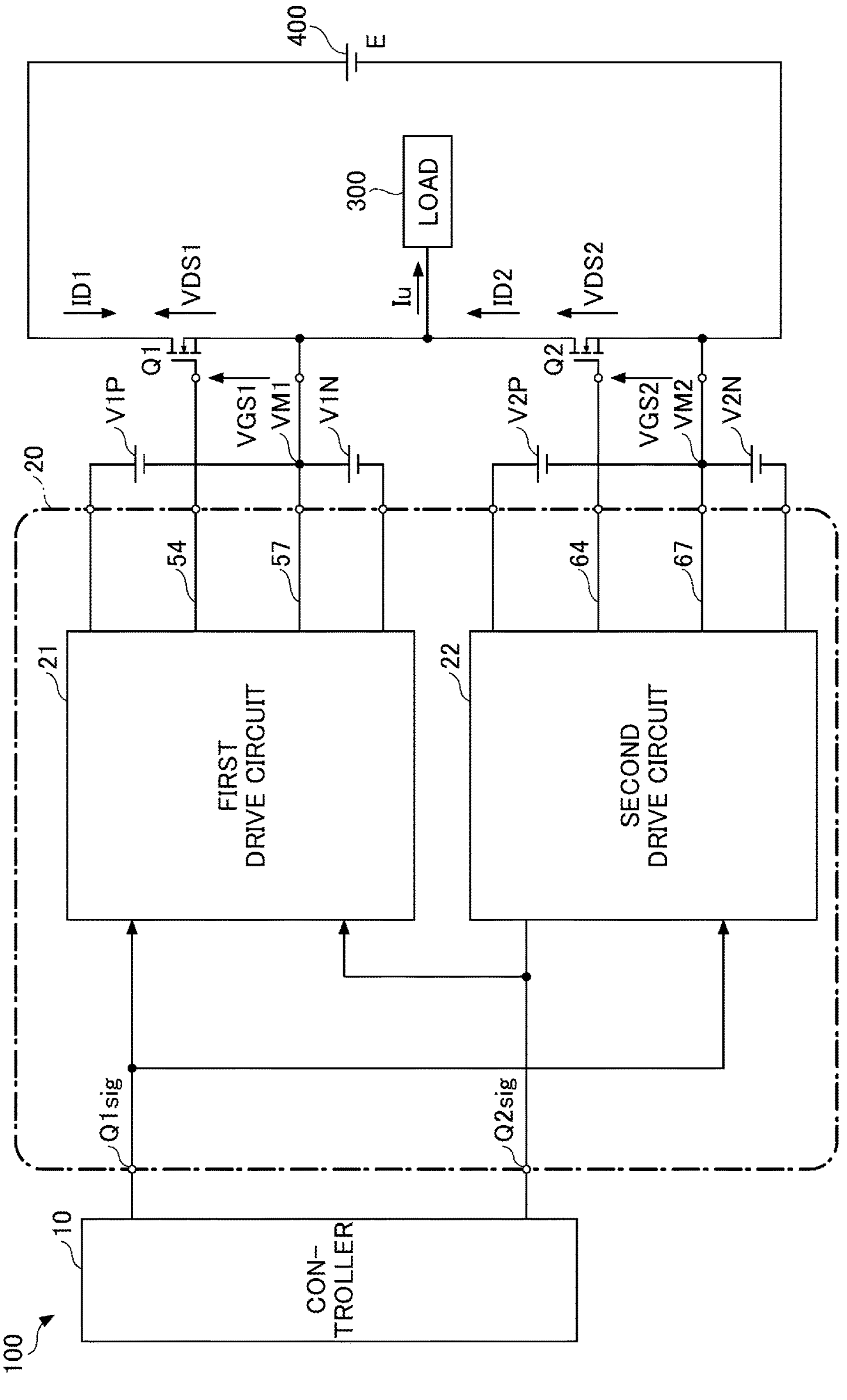
FIG. 1 is a diagram illustrating a configuration example of a power converter.

FIG. 1 is a diagram illustrating a configuration example of a power converter. A power converter 100 illustrated in FIG. 1 may be an inverter that converts direct current into alternating current, or a converter that converts alternating current into direct current, or converts direct current into direct current. For example, the power converter 100 is an inverter that converts power of a DC voltage E supplied from a DC power supply 400 into AC power to be supplied to a load 300, such as a motor or the like. The power converter 100 includes a controller 10, a driving device 20, an upper arm Q1, a lower arm Q2, and the DC power supply 400.

FIG. 1 illustrates an arm for one phase in which the upper arm Q1 and the lower arm Q2 are connected in series, and the driving device 20 for one phase that drives the arm. In a case where the power converter 100 is an inverter that generates AC power of three phases U, V, and W, for example, the power converter 100 includes arms for the three phases having the same configuration as the arm illustrated in FIG. 1, and driving devices for three phases having the same configuration as the driving device 20 illustrated in FIG. 1. A node between the high-side upper arm Q1 and the low-side lower arm Q2 is connected to the load 300.

The driving device 20 alternately switches the upper arm Q1 and the lower arm Q2 that are connected in series, with a dead time in between, during which dead time the upper arm Q1 and the lower arm Q2 are simultaneously turned off, according to command signals Q1*sig* and Q2*sig* supplied from the controller 10. The term "simultaneously" may be synonymous with "during the same period". The command signal Q1*sig* is a control signal for commanding an on or off period of the upper arm Q1. The command signal Q2*sig* is a control signal for commanding an on or off period of the lower arm Q2. The driving device 20 includes a first drive circuit 21 and a second drive circuit 22.

The first drive circuit 21 drives the upper arm Q1 according to the command signals Q1*sig* and Q2*sig*. The first drive circuit 21 switches a gate-source voltage VGS1 of the upper arm Q1 to a first positive power supply voltage V1P, or a first negative power supply voltage V1N, or a first intermediate voltage VM1. The first intermediate voltage VM1 is higher than the first negative power supply voltage V1N and lower than the first positive power supply voltage V1P, and more particularly, is higher than the first negative power supply voltage V1N and lower than a threshold voltage of the upper arm Q1.

The second drive circuit 22 drives the lower arm Q2 according to the command signals Q1*sig* and Q2*sig*. The second drive circuit 22 switches a gate-source voltage VGS2 of the lower arm Q2 to a second positive power supply voltage V2P, or a second negative power supply voltage V2N, or a second intermediate voltage VM2. The second intermediate voltage VM2 is higher than the second negative power supply voltage V2N and lower than the second positive power supply voltage V2P, and more particularly, is higher than the second negative power supply voltage V2N and lower than a threshold voltage of the lower arm Q2.

Each of the upper arm Q1 and the lower arm Q2 is a voltage-driven semiconductor element, that is, a switching element having a control electrode, a first main electrode, and a second main electrode. Specific examples of the upper arm Q1 and the lower arm Q2 include metal oxide semiconductor field effect transistors (MOSFETs) or the like. FIG. 1 illustrates an example of a case where each of the upper arm Q1 and the lower arm Q2 is an N-channel MOSFET having a gate, a source, and a drain. The gate is an example of the control electrode. The source is an example of the first main electrode. The drain is an example of the second main electrode.

The control electrode of the upper arm Q1 is electrically connected to a first control line 54 of the first drive circuit 21. The first main electrode of the upper arm Q1 is electrically connected to a first reference line 57 of the first drive circuit 21, the second main electrode of the lower arm Q2, and the load 300. The second main electrode of the upper arm Q1 is electrically connected to a positive electrode side of the DC power supply 400.

The control electrode of the lower arm Q2 is electrically connected to a second control line 64 of the second drive circuit 22. The first main electrode of the lower arm Q2 is electrically connected to a second reference line 67 of the second drive circuit 22, and to a negative electrode side of the DC power supply 400. The second main electrode of the lower arm Q2 is electrically connected to the first reference line 57 of the first drive circuit 21, the first main electrode of the upper arm Q1, and the load 300.

Each of the upper arm Q1 and the lower arm Q2 may be an element formed of a silicon semiconductor or element formed of a wide bandgap semiconductor having a bandgap larger than a bandgap of silicon. Examples of the wide bandgap semiconductor include gallium nitride, silicon carbide, diamond, or the like. When each of the upper arm Q1 and the lower arm Q2 is an element formed of the wide bandgap semiconductor, a power conversion efficiency of the power converter 100 can be increased.

Each of the upper arm Q1 and the lower arm Q2 is a SiC-MOSFET having a gate, a source, and a drain, for example. SiC is the abbreviation for silicon carbide, and MOSFET is the abbreviation for metal oxide semiconductor field effect transistor. A switching element, such as the SiC-MOSFET or the like, includes a channel between the source and the drain, and a body diode having a direction from the source to the drain as a forward direction. The upper arm Q1 is an example of a first switching element or a first SiC-MOSFET. The lower arm Q2 is an example of a second switching element or a second SiC-MOSFET.

Next, an operation will be described for a case where a driving method employed by the driving device 20 is applied to driving one phase (for example, a U-phase arm) of the power converter 100. Because two phases (for example, a V phase and a W phase) other than the one phase described in the following are also driven in the same manner as the one phase, the following description of the operation for the one phase is applicable to the operation for the other phases.

First, a driving method according to a comparative example will be described for comparison with the driving method according to the present disclosure.

Figure 2:
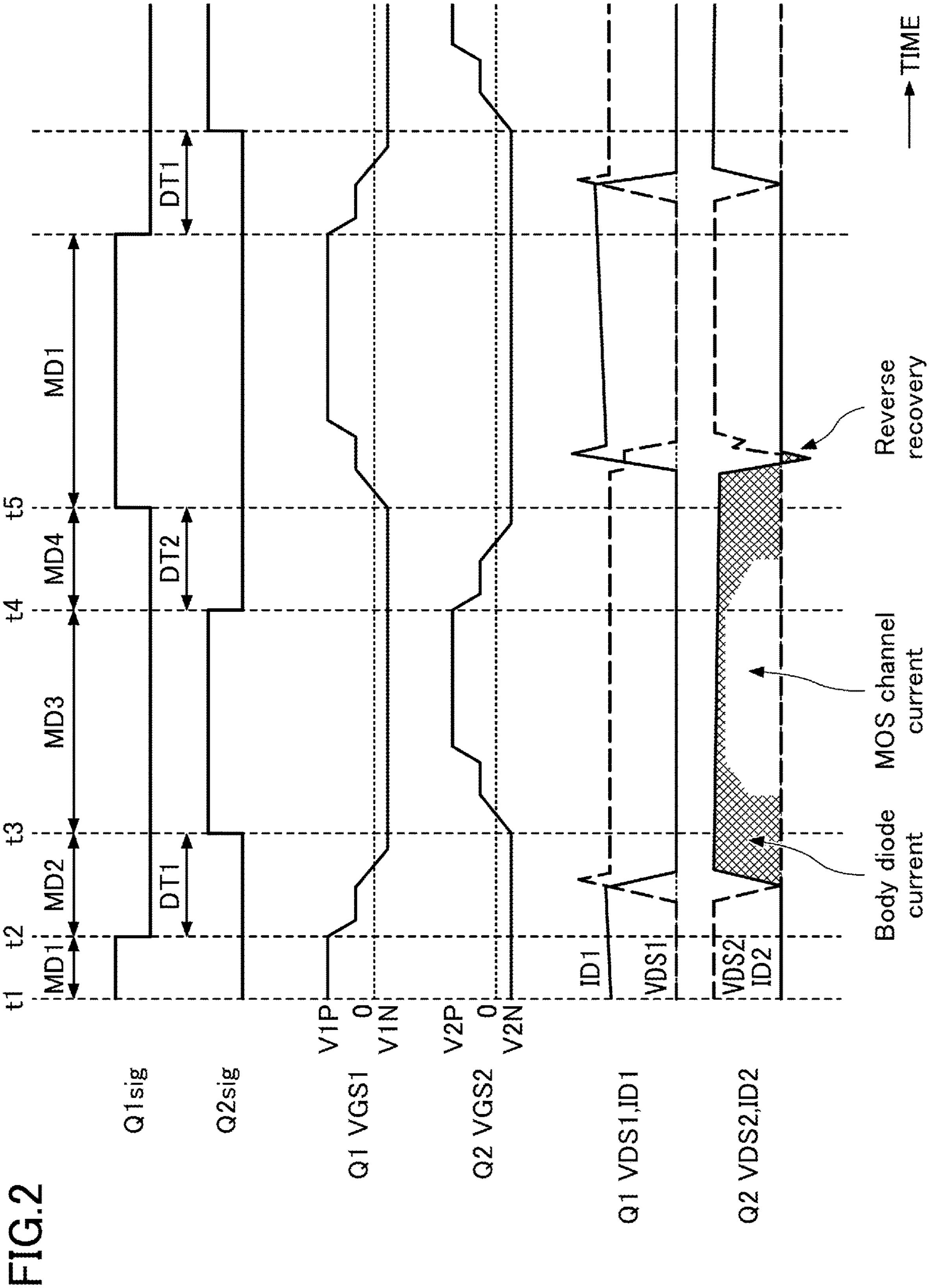
FIG. 2 is a timing chart illustrating an operation by a driving method according to a comparative example.

FIG. 2 is a timing chart illustrating an operation by the driving method according to the comparative example. In the following description of FIG. 2, the reference numerals designating constituent elements of the power converter 100 illustrated in FIG. 1 are used for the sake of convenience. As illustrated in FIG. 2, the switching operation for one phase of the power converter 100 is divided into four operation modes, namely, a mode MD1, a mode MD2, a mode MD3, and a mode MD4.

During the operation in the mode MD1 from a time t1 to a time t2, the command signal Q1*sig* has a high level, and the command signal Q2*sig* has a low level. For this reason, the gate-source voltage VGS1 of the upper arm Q1 becomes the same voltage as the first positive power supply voltage V1P, and the gate-source voltage VGS2 of the lower arm Q2 becomes the same voltage as the second negative power supply voltage V2N.

Accordingly, the upper arm Q1 assumes an on state, the lower arm Q2 assumes an off state, and a drain current ID1 of the upper arm Q1 flows through a U-phase coil of the load 300 as an output current Iu. As a result, the drain current ID1 of the upper arm Q1 increases, and the current Iu also gradually increases. In addition, the output current Iu assumes a positive value. During the mode MD1, because the lower arm Q2 assumes the off state, a value of a drain current ID2 becomes 0 [A].

Next, at the time t2, the switching operation for one phase of the power converter 100 is switched from the mode MD1 to the mode MD2. The mode MD2 is a mode in which the upper arm Q1 is switched from the on state to the off state, so that both the upper arm Q1 and the lower arm Q2 assume the off state, in order to form a first dead time DT1. The first dead time DT1 is a period for preventing a feed-through current from flowing between the upper arm Q1 and the lower arm Q2 by preventing the upper arm Q1 and the lower arm Q2 from simultaneously assuming the on state.

In the operation during the mode MD2, the gate-source voltage VGS1 of the upper arm Q1 becomes the same voltage as the first negative power supply voltage V1N after a mirror period, and the gate-source voltage VGS2 of the lower arm Q2 becomes the same voltage as the second negative power supply voltage V2N. For this reason, the upper arm Q1 is switched from the on state to the off state, and the lower arm Q2 maintains the off state. Accordingly, both the upper arm Q1 and the lower arm Q2 assume the off state.

In this state, a return current flowing through a built-in body diode of the lower arm Q2 flows to the load 300. Because this return current is a current based on an inductance or the like of the load 300, the output current Iu gradually decreases while maintaining a positive value. This return current is a current passing through the built-in body diode of the lower arm Q2, and corresponds to the drain current ID2 flowing from the source to the drain of the lower arm Q2. On the other hand, during the mode MD2, the upper arm Q1 assumes the off state, and thus, the drain current ID1 of the upper arm Q1 decreases to 0 [A].

Thereafter, at a time t3, the switching operation for one phase of the power converter 100 is switched from the mode MD2 to the mode MD3. The mode MD3 is a mode in which the lower arm Q2 is switched from the off state to the on state, and the return current flows through both the channel and the body diode of the lower arm Q2.

During the mode MD3, the command signal Q2*sig* is inverted from the low level to the high level. For this reason, the gate-source voltage VGS2 of the lower arm Q2 becomes the same voltage as the second positive power supply voltage V2P. Thus, because a forward bias voltage is output to the gate-source voltage VGS2 of the lower arm Q2, the lower arm Q2 is switched from the off state to the on state. When the lower arm Q2 assumes the on state, the return current flows through both the channel and the body diode of the lower arm Q2. Accordingly, during the mode MD3, an on-resistance of the channel and an on-resistance of the body diode of the lower arm Q2 are connected in parallel, and the resistance is lower than that during the mode MD2 in which the return current flows through only the body diode. During the mode MD3, the upper arm Q1 is maintained in the off state.

The return current during the mode MD3 is a current based on the inductance or the like of the load 300, similar to the case during the mode MD2, and the current value of the return current gradually approaches 0 [A]. As a result, the output current Iu gradually decreases while maintaining a positive value.

Thereafter, at a time t4, the switching operation for one phase of the power converter 100 is switched from the mode MD3 to the mode MD4. The mode MD4 is a mode in which the lower arm Q2 is switched from the on state to the off state, so that both the upper arm Q1 and the lower arm Q2 assume the off state, in order to form a second dead time DT2, similar to the mode MD2 described above. The second dead time DT2 is a period for preventing a feed-through current from flowing between the upper arm Q1 and the lower arm Q2 by preventing the upper arm Q1 and the lower arm Q2 from simultaneously assuming the on state.

In the operation during the mode MD4, the gate-source voltage VGS2 of the lower arm Q2 becomes the same voltage as the second negative power supply voltage V2N after the mirror period, and the gate-source voltage VGS1 of the upper arm Q1 becomes the same voltage as the first negative power supply voltage V1N. For this reason, the lower arm Q2 is switched from the on state to the off state, and the upper arm Q1 maintains the off state. Hence, both the upper arm Q1 and the lower arm Q2 assume the off state.

In this state, a return current flowing through the built-in body diode of the lower arm Q2 flows to the load 300. Because the return current is a current based on the inductance or the like of the load 300, the output current Iu gradually decreases while maintaining a positive value. In addition, during the mode MD4, because the upper arm Q1 assumes the off state, the drain current ID1 of the upper arm Q1 is maintained at 0 [A]. On the other hand, this return current is a current passing through the built-in body diode of the lower arm Q2, and corresponds to the drain current ID2 flowing from the source to the drain of the lower arm Q2.

Thereafter, at a time t5, the switching operation for one phase of the power converter 100 is switched from the mode MD4 to the mode MD1. In this mode MD1, the upper arm Q1 assumes the on state, and the lower arm Q2 maintains the off state, as described above.

In this mode MD1, the command signal Q1*sig* is inverted from the low level to the high level, and the command signal Q2*sig* maintains the low level. For this reason, the upper arm Q1 is switched from the off state to the on state, a drain-source voltage VDS1 of the upper arm Q1 decreases from a DC voltage E of the DC power supply 400 to "0 (zero)", and the drain current ID1 increases from zero in a positive direction (a direction from the drain to the source).

In contrast, on the low side, the lower arm Q2 maintains the off state, but a high dv/dt is generated in the lower arm Q2 (a drain-source voltage VDS2 rapidly increases) because the upper arm Q1 is turned on, and a reverse recovery current due to the high dv/dt flows through the body diode of the lower arm Q2. After the reverse recovery current converges, the drain current ID2 becomes zero.

However, as described above, during the dead times DT1 and DT2, the return current flows only through the body diode of the lower arm Q2, and may cause deterioration of the lower arm Q2 which is a switching element, such as a SiC-MOSFET or the like. Moreover, because an on-voltage (a forward voltage) of the body diode is relatively high, this may cause a loss of the lower arm Q2 to increase.

Figure 3:
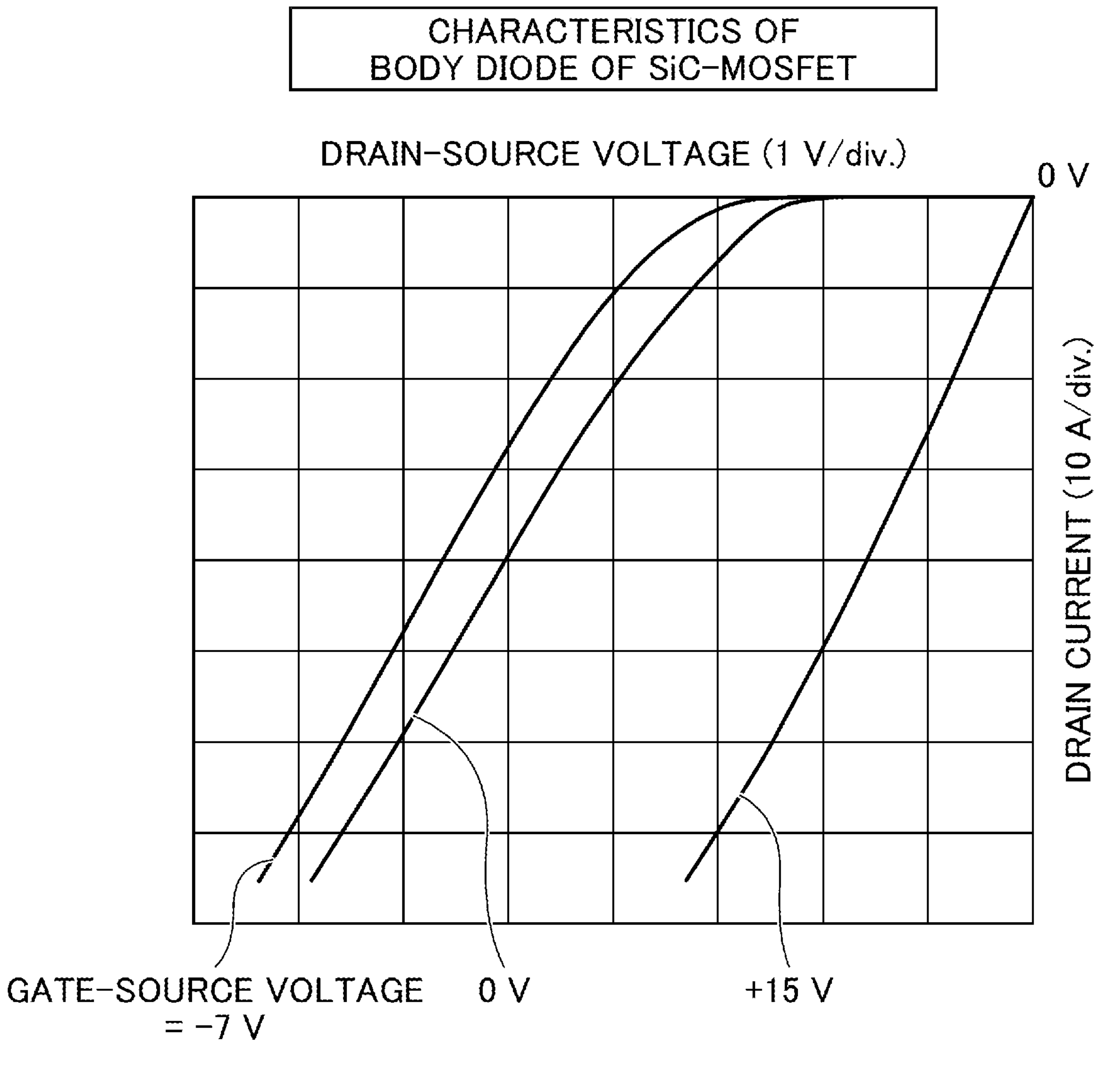
FIG. 3 is a diagram illustrating an example of characteristics of a body diode of a SiC-MOSFET.

FIG. 3 is a diagram illustrating an example of characteristics of a body diode of the SiC-MOSFET. In FIG. 3, the abscissa indicates a drain-source voltage (a voltage across the body diode) as a voltage of the drain viewed from the source, and is thus represented by a negative value. When a gate-source voltage is increased, the drain-source voltage (voltage across the body diode) decreases, and thus the loss decreases. In the driving method of FIG. 2 described above, because a reverse bias (a negative power supply voltage) is applied between the gate and the source during the dead time, a large loss occurs. In view of this large loss that occurs in the driving method of FIG. 2, in the driving method according to the present disclosure, a voltage (a gate voltage) applied between the gate and the source of the switching element, such as the SiC-MOSFET or the like, is set to an intermediate voltage that is higher than the negative power supply voltage and lower than the threshold voltage of the switching element, during the dead time.

Figure 4:
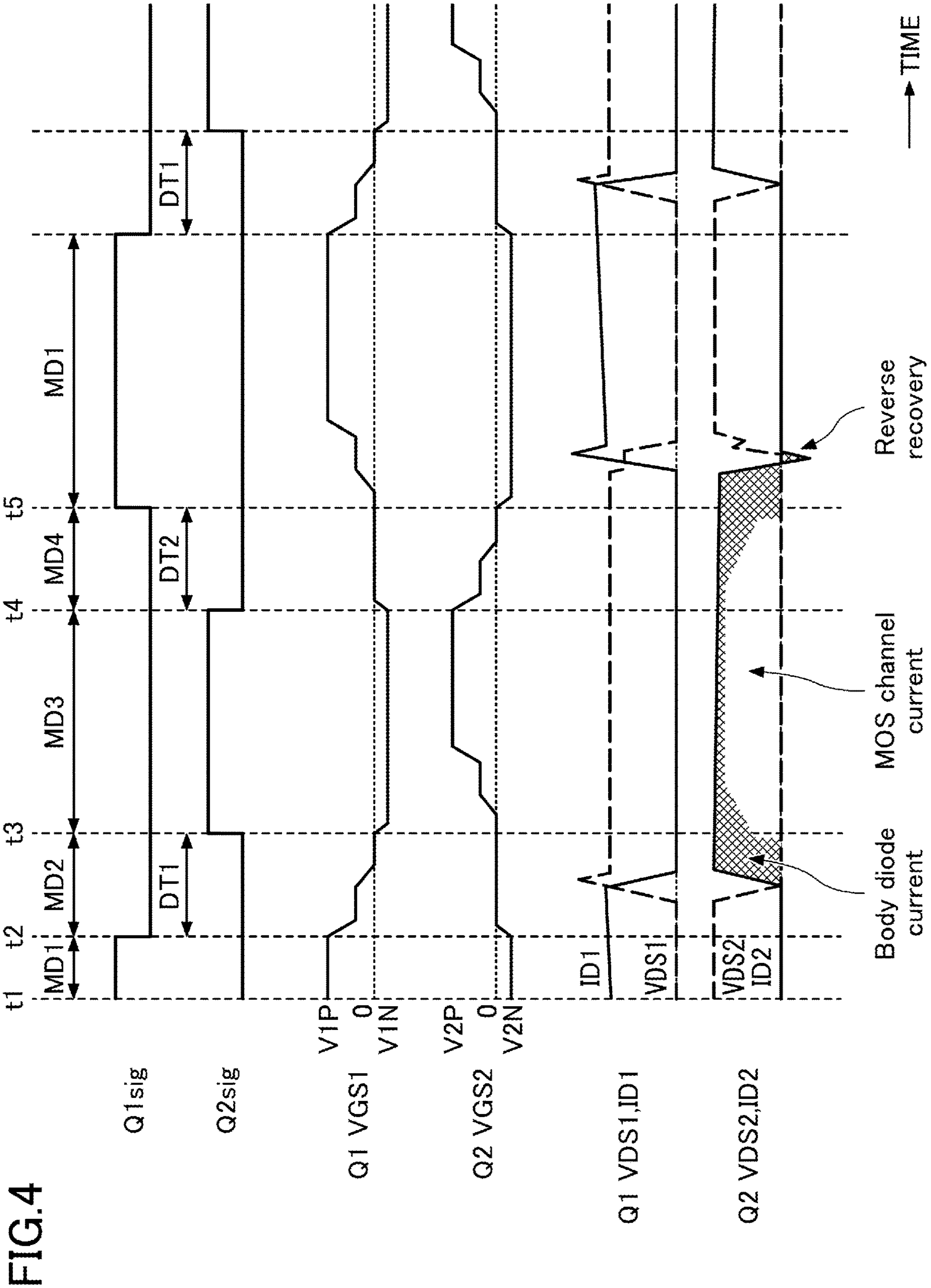
FIG. 4 is a timing chart illustrating an operation by a first driving method according to the present disclosure.

FIG. 4 is a timing chart illustrating an operation by a first driving method according to the present disclosure. In the following description of FIG. 4, references are made using the reference numerals designating the constituent elements of the power converter 100 illustrated in FIG. 1. As illustrated in FIG. 4, the switching operation for one phase of the power converter 100 is divided into the four operations of the mode MD1, the mode MD2, the mode MD3, and the mode MD4.

In the operation during the mode MD1 from the time t1 to the time t2, the command signal Q1*sig* has a high level, and the command signal Q2*sig* has a low level. For this reason, the gate-source voltage VGS1 of the upper arm Q1 has the same voltage as the first positive power supply voltage V1P, and the gate-source voltage VGS2 of the lower arm Q2 has the same voltage as the second negative power supply voltage V2N.

Accordingly, the upper arm Q1 assumes the on state, the lower arm Q2 assumes the off state, and the drain current ID1 of the upper arm Q1 flows through the U-phase coil of the load 300 as the output current Iu. As a result, the drain current ID1 of the upper arm Q1 increases, and the output current Iu also gradually increases. In addition, the output current Iu assumes a positive value. During the mode MD1, because the lower arm Q2 assumes the off state, the value of the drain current ID2 becomes 0 [A].

Hence, during the mode MD1, the first drive circuit 21 sets the gate voltage of the upper arm Q1 to the first positive power supply voltage V1P, and the second drive circuit 22 sets the gate voltage of the lower arm Q2 to the second negative power supply voltage V2N.

Next, at the time t2, the switching operation for one phase of the power converter 100 is switched from the mode MD1 to the mode MD2. The mode MD2 is a mode for forming the first dead time DT1. The first dead time DT1 is a period immediately after an on-command period of the upper arm Q1 by the command signal Q1*sig*, and immediately before an on-command period of the lower arm Q2 by the command signal Q2*sig*.

In the operation during the mode MD2, the gate-source voltage VGS1 of the upper arm Q1 becomes the first intermediate voltage VM1 after the mirror period, and the gate-source voltage VGS2 of the lower arm Q2 becomes the second intermediate voltage VM2. The first intermediate voltage VM1 is higher than the first negative power supply voltage V1N and lower than the threshold voltage of the upper arm Q1, and is zero in the example illustrated in FIG. 4. The second intermediate voltage VM2 is higher than the second negative power supply voltage V2N and lower than the threshold voltage of the lower arm Q2, and is zero in the example illustrated in FIG. 4.

In this state, because the second intermediate voltage VM2 is substantially zero, the channel of the lower arm Q2 opens slightly. Thus, a circulating current (a return current) that flows during the mode MD2 flows through both the channel and the body diode of the lower arm Q2. For this reason, during the mode MD2, the on-resistance of the channel and the on-resistance of the body diode of the lower arm Q2 are connected in parallel. Accordingly, because the voltage between the drain and the source of the lower arm Q2 decreases, the loss of the lower arm Q2 decreases. Further, because a rectified current (return current) is split between the body diode and the channel, a current component flowing through the body diode decreases, and a deterioration caused by the current flowing through the body diode can be prevented.

During the mode MD2, the return current flowing through the channel and the body diode of the lower arm Q2 flows to the load 300 as the output current Iu. Because this return current is a current based on the inductance or the like of the load 300, the output current Iu gradually decreases while maintaining a positive value. This return current is a current passing through the channel and the body diode of the lower arm Q2, and corresponds to the drain current ID2 flowing from the source to the drain of the lower arm Q2. On the other hand, during the mode MD2, because the upper arm Q1 assumes the off state, the drain current ID1 of the upper arm Q1 decreases to 0 [A].

Accordingly, during the mode MD2, when the first dead time DT1 starts, the first drive circuit 21 changes the gate voltage of the upper arm Q1 from the first positive power supply voltage V1P to the first intermediate voltage VM1. On the other hand, when the first dead time DT1 starts, the second drive circuit 22 changes the gate voltage of the lower arm Q2 from the second negative power supply voltage V2N to the second intermediate voltage VM2.

Thereafter, at the time t3, the switching operation for one phase of the power converter 100 is switched from the mode MD2 to the mode MD3. The mode MD3 is a mode in which the lower arm Q2 is switched from the off state to the on state and the return current flows through both the channel and the body diode of the lower arm Q2.

During the mode MD3, the command signal Q2*sig* is inverted from the low level to the high level. For this reason, the gate-source voltage VGS2 of the lower arm Q2 becomes the same voltage as the second positive power supply voltage V2P. Thus, because a forward bias voltage is output to the gate-source voltage VGS2 of the lower arm Q2, the lower arm Q2 is switched from the off state to the on state. When the lower arm Q2 assumes the on state, the return current flows through both the channel and the body diode of the lower arm Q2. For this reason, during the mode MD3, the on-resistance of the channel and the on-resistance of the body diode of the lower arm Q2 are connected in parallel, and the resistance becomes lower than the resistance during the mode MD2 in which the return current flows only through the body diode. During the mode MD3, the upper arm Q1 maintains the off state.

The return current during the mode MD3 is a current based on the inductance or the like of the load 300, similar to the case during the mode MD2, and the current value of the return current gradually approaches 0 [A]. As a result, the output current Iu gradually decreases while maintaining a positive value.

Accordingly, during the mode MD3, the first drive circuit 21 changes the gate voltage of the upper arm Q1 from the first intermediate voltage VM1 to the first negative power supply voltage V1N when the first dead time DT1 ends. On the other hand, when the first dead time DT1 ends, the second drive circuit 22 changes the gate voltage of the lower arm Q2 from the second intermediate voltage VM2 to the second positive power supply voltage V2P.

Thereafter, at a time t4, the switching operation for one phase of the power converter 100 is switched from the mode MD3 to the mode MD4. The mode MD4 is a mode for forming the second dead time DT2, similar to the mode MD2 described above. The second dead time DT2 is a period immediately after the on-command period of the lower arm Q2 by the command signal Q2*sig* and immediately before the on-command period of the upper arm Q1 by the command signal Q1*sig*.

In the operation during the mode MD4, the gate-source voltage VGS2 of the lower arm Q2 becomes the second intermediate voltage VM2 after the mirror period, and the gate-source voltage VGS1 of the upper arm Q1 becomes the first intermediate voltage VM1. The first intermediate voltage VM1 is higher than the first negative power supply voltage V1N and lower than the threshold voltage of the upper arm Q1, and is zero in the example illustrated in FIG. 4. The second intermediate voltage VM2 is higher than the second negative power supply voltage V2N and lower than the threshold voltage of the lower arm Q2, and is zero in the example illustrated in FIG. 4.

In this state, because the second intermediate voltage VM2 is substantially zero, the channel of the lower arm Q2 opens slightly. Thus, the circulating current (return current) that flows during the mode MD4 flows through both the channel and the body diode of the lower arm Q2. For this reason, during the mode MD4, the on-resistance of the channel and the on-resistance of the body diode of the lower arm Q2 are connected in parallel. Accordingly, because the voltage between the drain and the source of the lower arm Q2 decreases, the loss of the lower arm Q2 decreases. Further, because the rectified current (return current) is split between the body diode and the channel, the current component flowing through the body diode decreases, and the deterioration caused by the current flowing through the body diode can be prevented.

During the mode MD4, the return current flowing through the channel and the body diode of the lower arm Q2 flows to the load 300 as the output current Iu. Because this return current is a current based on the inductance or the like of the load 300, the output current Iu gradually decreases while maintaining a positive value. This return current is a current passing through the channel and the body diode of the lower arm Q2, and corresponds to the drain current ID2 flowing from the source to the drain of the lower arm Q2. On the other hand, during the mode MD4, because the upper arm Q1 assumes the off state, the drain current ID1 of the upper arm Q1 is maintained at 0 [A].

Accordingly, during the mode MD4, when the second dead time DT2 starts, the first drive circuit 21 changes the gate voltage of the upper arm Q1 from the first negative power supply voltage V1N to the first intermediate voltage VM1. On the other hand, when the first dead time DT1 starts, the second drive circuit 22 changes the gate voltage of the lower arm Q2 from the second positive power supply voltage V2P to the second intermediate voltage VM2.

Thereafter, at a time t5, the switching operation for one phase of the power converter 100 is switched from the mode MD4 to the mode MD1. During this mode MD1, the upper arm Q1 assumes the on state, and the lower arm Q2 maintains the off state, as described above.

During this mode MD1, the command signal Q1*sig* is inverted from the low level to the high level, and the command signal Q2*sig* maintains the low level. For this reason, the upper arm Q1 is switched from the off state to the on state, the drain-source voltage VDS1 of the upper arm Q1 decreases from the DC voltage E of the DC power supply 400 to "0", and the drain current ID1 increases from zero in the positive direction (the direction from the drain to the source).

On the other hand, on the low side, the lower arm Q2 maintains the off state, but a high dv/dt is generated in the lower arm Q2 (the drain-source voltage VDS2 rapidly increases) because the upper arm Q1 is turned on, and a reverse recovery current due to the high dv/dt flows through the body diode of the lower arm Q2. After the reverse recovery current converges, the drain current ID2 becomes zero.

Accordingly, during the mode MD1, the first drive circuit 21 changes the gate voltage of the upper arm Q1 from the first intermediate voltage VM1 to the first positive power supply voltage V1P when the second dead time DT2 ends. On the other hand, when the second dead time DT2 ends, the second drive circuit 22 changes the gate voltage of the lower arm Q2 from the second intermediate voltage VM2 to the second negative power supply voltage V2N.

Hence, according to the driving method illustrated in FIG. 4, the gate voltage of the lower arm Q2 during the dead time is set to the second intermediate voltage VM2. Thus, during the reflux mode in which the reflux current flows through the body diode of the lower arm Q2, the reflux current decreases compared to the case where the gate voltage of the lower arm Q2 during the dead time is set to the second negative power supply voltage V2N. Accordingly, the deterioration of the lower arm Q2 can be prevented. Similarly, the gate voltage of the upper arm Q1 during the dead time is set to the first intermediate voltage VM1. Thus, during the reflux mode in which the reflux current flows through the body diode of the upper arm Q1, the reflux current decreases compared to the case where the gate voltage of the upper arm Q1 during the dead time is set to the first negative power supply voltage V1N. Accordingly, the deterioration of the upper arm Q1 can be prevented.

Next, more specific configuration examples of the driving device and the power converter will be described.

Figure 5:
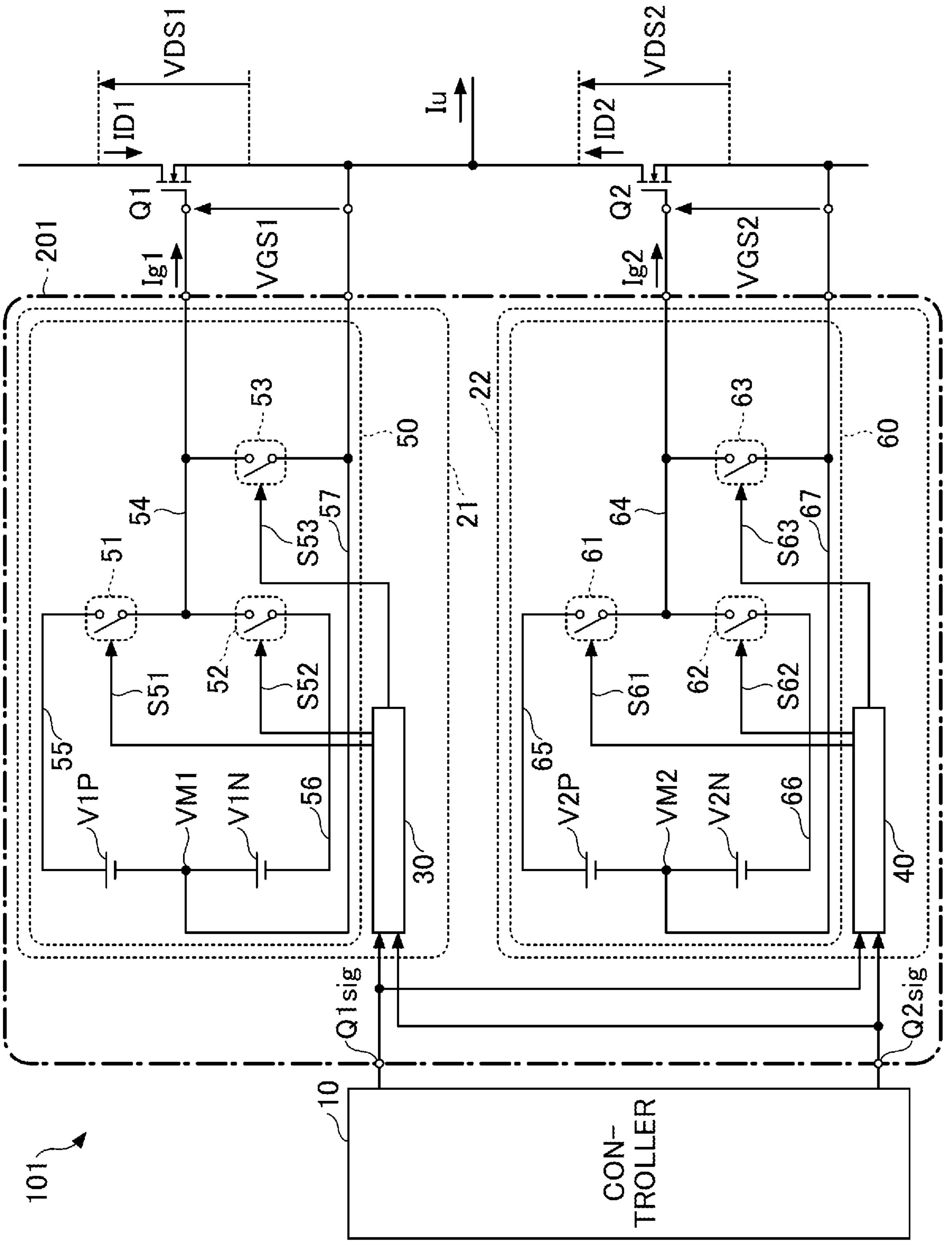
FIG. 5 is a diagram illustrating a configuration example of a power converter including a driving device according to a first embodiment.

FIG. 5 is a diagram illustrating a configuration example of a power converter including the driving device according to the first embodiment. In FIG. 5, a power converter 101 is an embodiment of the power converter 100, and a driving device 201 is an embodiment of the driving device 20.

The driving device 201 includes the first drive circuit 21 that drives the upper arm Q1, and the second drive circuit 22 that drives the lower arm Q2. The second drive circuit 22 has the same configuration as the first drive circuit 21.

The first drive circuit 21 includes a first control circuit 30, and a first gate drive circuit 50. The first control circuit 30 generates drive signals S51, S52, and S53 for driving the first gate drive circuit 50, based on command contents of the command signals Q1*sig* and Q2*sig*. The first gate drive circuit 50 drives the upper arm Q1 according to the drive signals S51, S52, and S53 supplied from the first control circuit 30. The first gate drive circuit 50 includes the first control line 54, a first positive power supply line 55, a first negative power supply line 56, the first reference line 57, a first switching circuit 51, a second switching circuit 52, and a third switching circuit 53.

The first control line 54 is a drive line electrically connected to the control electrode of the upper arm Q1. The first positive power supply line 55 is a reference potential line set to the first positive power supply voltage V1P which is a positive voltage for maintaining the upper arm Q1 in the on state, and is connected to a positive power supply which generates the first positive power supply voltage V1P. The first negative power supply line 56 is a reference potential line set to the first negative power supply voltage V1N which is a negative voltage for maintaining the upper arm Q1 in an off state, and is connected to a negative power supply which generates the first negative power supply voltage V1N. The first reference line 57 is a reference potential line electrically connected to the first main electrode of the upper arm Q1, and is set to the first intermediate voltage VM1 that is higher than the first negative power supply voltage V1N and lower than the threshold voltage of the upper arm Q1.

The first switching circuit 51 is a circuit or an element that switches between electrically connecting and not electrically connecting the first control line 54 to the first positive power supply line 55, according to the drive signal S51 generated by the first control circuit 30. The first switching circuit 51 includes a first switch that is turned on or off according to the drive signal S51. When the first switch is turned on, the first control line 54 and the first positive power supply line 55 are electrically connected to each other, and when the first switch is turned off, the first control line 54 and the first positive power supply line 55 are electrically disconnected from each other.

The second switching circuit 52 is a circuit or an element that switches between electrically connecting and not electrically connecting the first control line 54 to the first negative power supply line 56, according to the drive signal S52 generated by the first control circuit 30. The second switching circuit 52 includes a second switch that is turned on or off according to the drive signal S52. When the second switch is turned on, the first control line 54 and the first negative power supply line 56 are electrically connected to each other, and when the second switch is turned off, the first control line 54 and the first negative power supply line 56 are electrically disconnected from each other.

The third switching circuit 53 is a circuit or an element that switches between electrically connecting and not electrically connecting the first control line 54 to the first reference line 57, according to the drive signal S53 generated by the first control circuit 30. The third switching circuit 53 includes a third switch that is turned on or off according to the drive signal S53. When the third switch is turned on, the first control line 54 and the first reference line 57 are electrically connected to each other, and when the third switch is turned off, the first control line 54 and the first reference line 57 are electrically disconnected from each other.

The first control circuit 30 detects the dead times DT1 and DT2, based on the command contents of the command signals Q1*sig* and Q2*sig*. The first control circuit 30 operates the third switching circuit 53, so that the first control line 54 is electrically connected to the first reference line 57 during the dead times DT1 and DT2. The first control circuit 30 turns on the third switch of the third switching circuit 53 only during each of the detected dead times DT1 and DT2, for example. Thus, the first gate drive circuit 50 applies the first intermediate voltage VM1 having a voltage value of substantially zero between the gate and the source of the upper arm Q1.

When the dead time is known, the first control circuit 30 may estimate the dead times DT1 and DT2 using a one-shot circuit or the like.

The second drive circuit 22 includes a second control circuit 40, and a second gate drive circuit 60. The second control circuit 40 generates drive signals S61, S62, and S63 for driving the second gate drive circuit 60, based on the command contents of the command signals Q1*sig* and Q2*sig*. The second gate drive circuit 60 drives the lower arm Q2, according to the drive signals S61, S62, and S63 supplied from the second control circuit 40. The second gate drive circuit 60 includes the second control line 64, a second positive power supply line 65, a second negative power supply line 66, the second reference line 67, a fourth switching circuit 61, a fifth switching circuit 62, and a sixth switching circuit 63.

The second control line 64 is a drive line electrically connected to the control electrode of the lower arm Q2. The second positive power supply line 65 is a reference potential line set to the second positive power supply voltage V2P which is a positive voltage for maintaining the lower arm Q2 in the on state, and is connected to a positive power supply which generates the second positive power supply voltage V2P. The second negative power supply line 66 is a reference potential line set to the second negative power supply voltage V2N which is a negative voltage for maintaining the lower arm Q2 in the off state, and is connected to a negative power supply that generates the second negative power supply voltage V2N. The second reference line 67 is a reference potential line electrically connected to the first main electrode of the lower arm Q2, and is set to the second intermediate voltage VM2 that is higher than the second negative power supply voltage V2N and lower than the threshold voltage of the lower arm Q2.

The fourth switching circuit 61 is a circuit or an element that switches between electrically connecting and not electrically connecting the second control line 64 to the second positive power supply line 65, according to the drive signal S61 generated by the second control circuit 40. The fourth switching circuit 61 includes a fourth switch that is turned on or off according to the drive signal S61. When the fourth switch is turned on, the second control line 64 and the second positive power supply line 65 are electrically connected to each other, and when the fourth switch is turned off, the second control line 64 and the second positive power supply line 65 are electrically disconnected from each other.

The fifth switching circuit 62 is a circuit or an element that switches between electrically connecting and not electrically connecting the second control line 64 to the second negative power supply line 66, according to the drive signal S62 generated by the second control circuit 40. The fifth switching circuit 62 includes a fifth switch that is turned on or off according to the drive signal S62. When the fifth switch is turned on, the second control line 64 and the second negative power supply line 66 are electrically connected to each other, and when the fifth switch is turned off, the second control line 64 and the second negative power supply line 66 are electrically disconnected from each other.

The sixth switching circuit 63 is a circuit or an element that switches between electrically connecting and not electrically connecting the second control line 64 to the second reference line 67, according to the drive signal S63 generated by the second control circuit 40. The sixth switching circuit 63 includes a sixth switch that is turned on or off according to the drive signal S63. When the sixth switch is turned on, the second control line 64 and the second reference line 67 are electrically connected to each other, and when the sixth switch is turned off, the second control line 64 and the second reference line 67 are electrically disconnected from each other.

The second control circuit 40 detects the dead times DT1 and DT2, based on the command contents of the command signals Q1*sig* and Q2*sig*. The second control circuit 40 operates the sixth switching circuit 63, so that the second control line 64 is electrically connected to the second reference line 67 during the dead times DT1 and DT2. The second control circuit 40 turns on the sixth switch of the sixth switching circuit 63 only during each of the detected dead times DT1 and DT2, for example. Thus, the second gate drive circuit 60 applies the second intermediate voltage VM2 having a voltage value of substantially zero between the gate and the source of the lower arm Q2.

When the dead time is known, the second control circuit 40 may estimate the dead times DT1 and DT2 using a one-shot circuit or the like.

Figure 6:
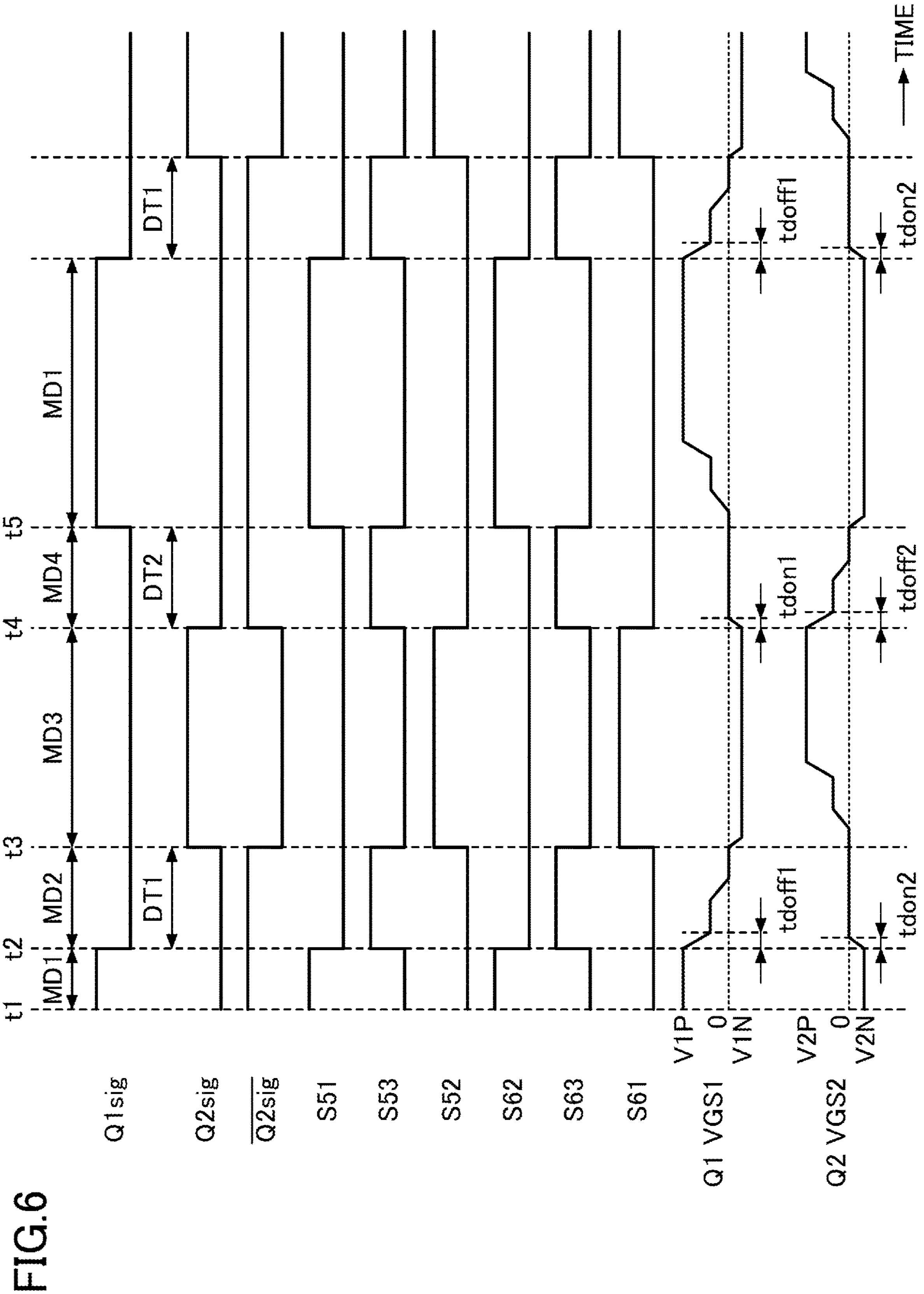
FIG. 6 is a timing chart illustrating a first driving method by the driving device of the first embodiment.

FIG. 6 is a timing chart illustrating the first driving method by the driving device according to the first embodiment. The drive signals S51, S52, and S53 turn on the switches of the switching circuits to be driven when the drive signals S51, S52, and S53 have a first logic level (a high level in this example), and turn off the switches of the switching circuits to be driven when the drive signals S51, S52, and S53 have a second logic level (a low level in this example).

The first control circuit 30 generates the drive signal S51 for turning on or off the first switch of the first switching circuit 51, according to the command signal Q1*sig* input from the controller 10. The first control circuit 30 generates the drive signal S51 for turning on the first switch of the first switching circuit 51 when the command signal Q1*sig* has the high level, and generates the drive signal S51 for turning off the first switch of the first switching circuit 51 when the command signal Q1*sig* has the low level.

The first control circuit 30 generates the drive signal S52 for turning on or off the second switch of the second switching circuit 52, according to the command signal Q2*sig* input from the controller 10. The first control circuit 30 generates the drive signal S52 for turning on the second switch of the second switching circuit 52 when the command signal Q2*sig* has the high level, and generates the drive signal S52 for turning off the second switch of the second switching circuit 52 when the command signal Q2*sig* has the low level.

The first control circuit 30 generates the drive signal S53 for turning on the third switch of the third switching circuit 53 only during the dead times DT1 and DT2, according to the command signal Q1*sig* input from the controller 10. The first control circuit 30 generates the drive signal S53 for turning on or off the third switch of the third switching circuit 53, according to an exclusive-OR of the command signal Q1*sig* and an inverted signal of the command signal Q2*sig*.

The switching circuits 51, 52, and 53 perform the on operation or the off operation in this manner, so that the gate voltage of the upper arm Q1 during the dead time can be set to the first intermediate voltage VM1. Thus, during the reflux mode in which the reflux current flows through the body diode of the upper arm Q1, the reflux current decreases compared to the case where the gate voltage of the upper arm Q1 during the dead time is set to the first negative power supply voltage V1N. Hence, the deterioration of the upper arm Q1 can be prevented.

The second control circuit 40 generates the drive signal S61 for turning on or off the first switch of the fourth switching circuit 61, according to the command signal Q2*sig* input from the controller 10. The second control circuit 40 generates the drive signal S61 for turning on the fourth switch of the fourth switching circuit 61 when the command signal Q2*sig* has the high level, and generates the drive signal S61 for turning off the fourth switch of the fourth switching circuit 61 when the command signal Q2*sig* has the low level.

The second control circuit 40 generates the drive signal S62 for turning on or off the fifth switch of the fifth switching circuit 62, according to the command signal Q1*sig* input from the controller 10. The second control circuit 40 generates the drive signal S62 for turning on the fifth switch of the fifth switching circuit 62 when the command signal Q1*sig* has the high level, and generates the drive signal S62 for turning off the fifth switch of the fifth switching circuit 62 when the command signal Q1*sig* has the low level.

The second control circuit 40 generates the drive signal S63 for turning on the sixth switch of the sixth switching circuit 63 only during the dead times DT1 and DT2, according to the command signals Q1*sig* and Q2*sig* input from the controller 10. The second control circuit 40 generates the drive signal S63 for turning on or off the sixth switch of the sixth switching circuit 63, according to an exclusive-OR of the command signal Q1*sig* and an inverted signal of the command signal Q2*sig*, for example.

When the switching circuits 61, 62, and 63 perform the on operation or the off operation in the manner described above, the gate voltage of the lower arm Q2 during the dead time can be set to the second intermediate voltage VM2. Thus, during the reflux mode in which the reflux current flows through the body diode of the lower arm Q2, the reflux current decreases compared to the case where the gate voltage of the lower arm Q2 during the dead time is set to the second negative power supply voltage V2N. Accordingly, the deterioration of the lower arm Q2 can be prevented.

The first drive circuit 21 may set the gate voltage of the upper arm Q1 during the dead time to a first intermediate voltage VM1 having a positive or negative voltage value instead of setting the gate voltage of the upper arm Q1 during the dead time to the first intermediate voltage VM1 having the voltage value of zero. Similarly, the second drive circuit 22 may set the gate voltage of the lower arm Q2 during the dead time to a second intermediate voltage VM2 having a positive or negative voltage value, instead of setting the gate voltage of the lower arm Q2 during the dead time to the second intermediate voltage VM2 having the voltage value of zero.

For example, the first intermediate voltage VM1 may be a positive voltage that is higher than zero and lower than the threshold voltage of the upper arm Q1, and the second intermediate voltage VM2 may be a positive voltage that is higher than zero and lower than the threshold voltage of the lower arm Q2. Thus, the intermediate voltage applied during the dead time becomes a positive voltage having such a value that the arm is not turned on. Hence, the current also flowing through the channel slightly increases, the voltage between the drain and the source of the arm decreases, and the loss decreases, to prevent the deterioration from progressing.

For example, the first intermediate voltage VM1 may be a negative voltage higher than the first negative power supply voltage V1N and lower than zero, and the second intermediate voltage VM2 may be a negative voltage higher than the second negative power supply voltage V2N and lower than zero. Thus, the intermediate voltage applied during the dead time becomes a negative voltage having such a value that the arm is not turned on. Hence, it is possible to prevent the arm from being erroneously turned on during the dead time due to noise or the like.

Figure 7:
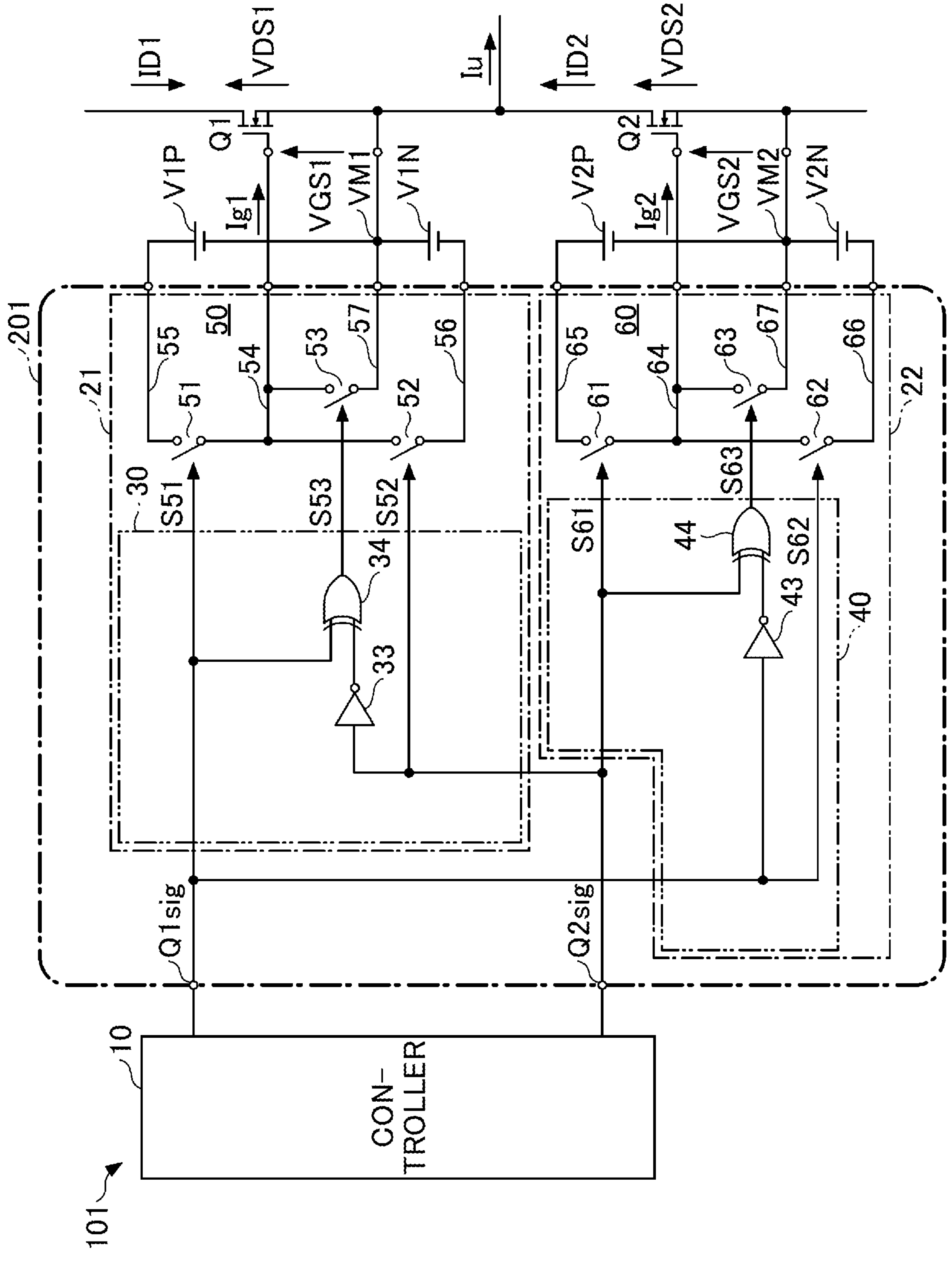
FIG. 7 is a diagram illustrating a configuration example of a first control circuit and a second control circuit.

FIG. 7 is a diagram illustrating a configuration example of the first control circuit 30 and the second control circuit 40.

The first control circuit 30 includes an inverter circuit 33, and an exclusive-OR gate 34. The second control circuit 40 includes an inverter circuit 43, and an exclusive-OR gate 44. Each of the inverter circuits 33 and 43 inverts the logic of an input signal and outputs the inverted signal. Each of the exclusive-OR gates 34 and 44 outputs an exclusive-OR of two logic levels that are input. Thus, the drive signals S51, S52, S53, S61, S62, and S63 illustrated in FIG. 6 are generated. The generated drive signals S51, S52, S53, S61, S62, and S63 are input to the respective switches via signal isolation elements (photocouplers or the like) that are not illustrated.

Figure 8:
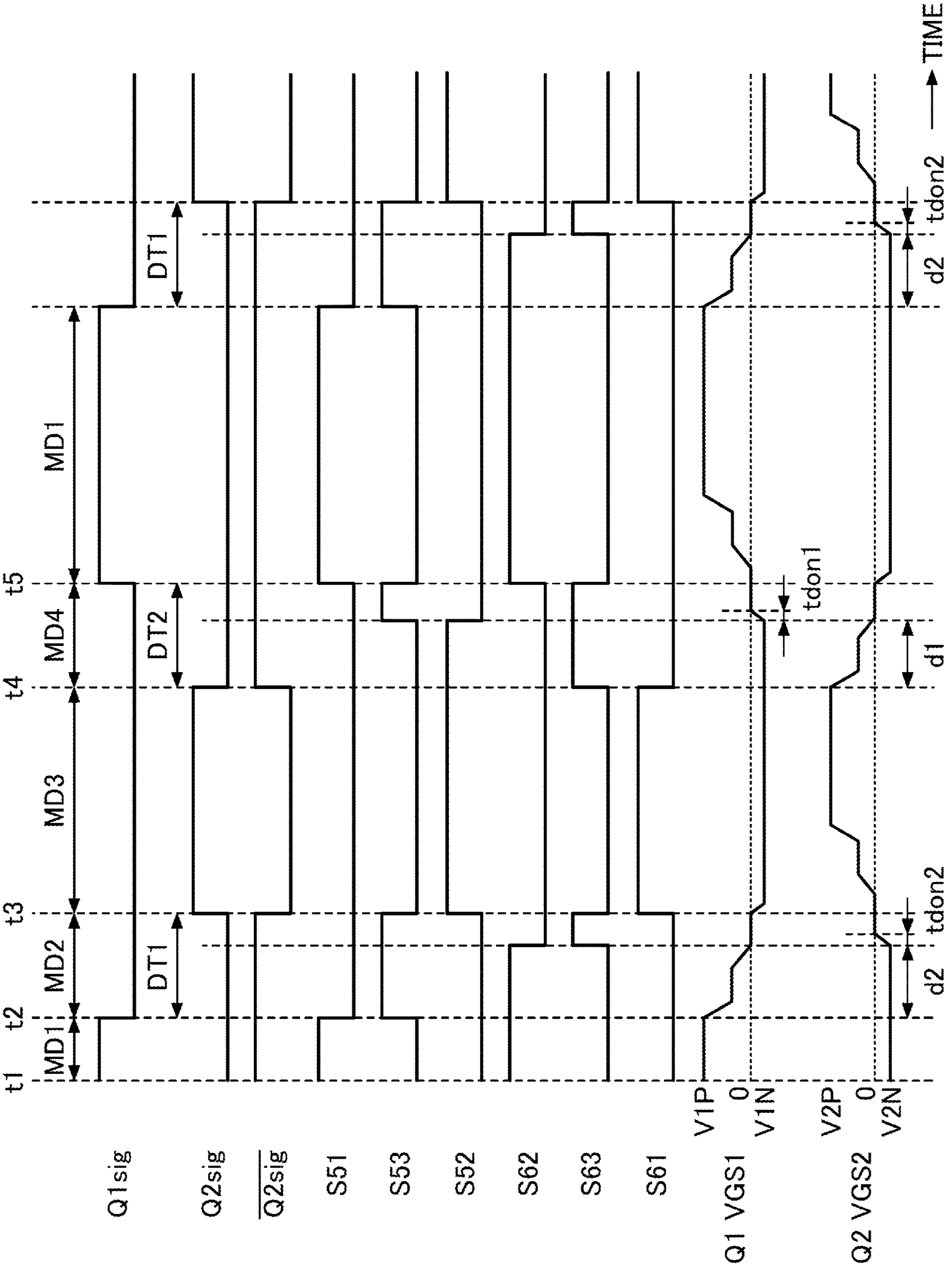
FIG. 8 is a timing chart illustrating a second driving method by the driving device according to the first embodiment.

FIG. 8 is a timing chart illustrating a second driving method by the driving device according to the first embodiment. The first control circuit 30 may change the drive signal S52 from the high level to the low level and change the drive signal S53 from the low level to the high level when a predetermined delay time d1 elapses from the time t4 when the dead time DT2 starts. Thus, the second switch of the second switching circuit 52 is turned off and the third switch of the third switching circuit 53 is turned on at an intermediate point of the dead time DT2 with a delay of the delay time d1 from the start of the dead time DT2. That is, the gate voltage of the upper arm Q1 during the dead time DT2 is switched from the first negative power supply voltage V1N to the first intermediate voltage VM1 at the intermediate point of the dead time DT2 with the delay of the delay time d1 from the start of the dead time DT2.

The second control circuit 40 may change the drive signal S62 from the high level to the low level and change the drive signal S63 from the low level to the high level when a predetermined delay time d2 elapses from the time t2 when the dead time DT1 starts. Thus, the fifth switch of the fifth switching circuit 62 is turned off and the sixth switch of the sixth switching circuit 63 is turned on at an intermediate point of the dead time DT1 with a delay of the delay time d2 from the start of the dead time DT1. That is, the gate voltage of the lower arm Q2 during the dead time DT1 is switched from the second negative power supply voltage V2N to the second intermediate voltage VM2 at the intermediate point of the dead time DT1 with the delay of the delay time d2 from the start of the dead time DT1.

During a period in which one arm of the upper arm Q1 and the lower arm Q2 opposing the other arm of the upper arm Q1 and the lower arm Q2 is switched from the on state to the off state (from the on state until a gate-source voltage VGS becomes zero, or a drain current ID becomes zero, or a drain-source voltage VDS becomes E), the one arm may not be completely turned off and may be erroneously turned on. In the driving method illustrated in FIG. 8, during the period in which the one arm of the upper arm Q1 and the lower arm Q2 opposing the other arm of the upper arm Q1 and the lower arm Q2 is switched from the on state to the off state, the one arm is prevented from turning on by negatively biasing the gate voltage of the one arm. Hence, even if the one arm is erroneously turned on during the period in which the one arm is switched from the on state to the off state, the one arm is prevented from being turned on, and thus, the generation of the current passing through the upper arm Q1 and the lower arm Q2 can be prevented.

The delay times d1 and d2 may be fixed values determined based on the period in which the one arm is switched from the on state to the off state, or may be variable values determined according to a time when the gate-source voltage VGS=0, or the drain current ID=0, or the drain-source voltage VDS for the one arm are detected.

Figure 9:
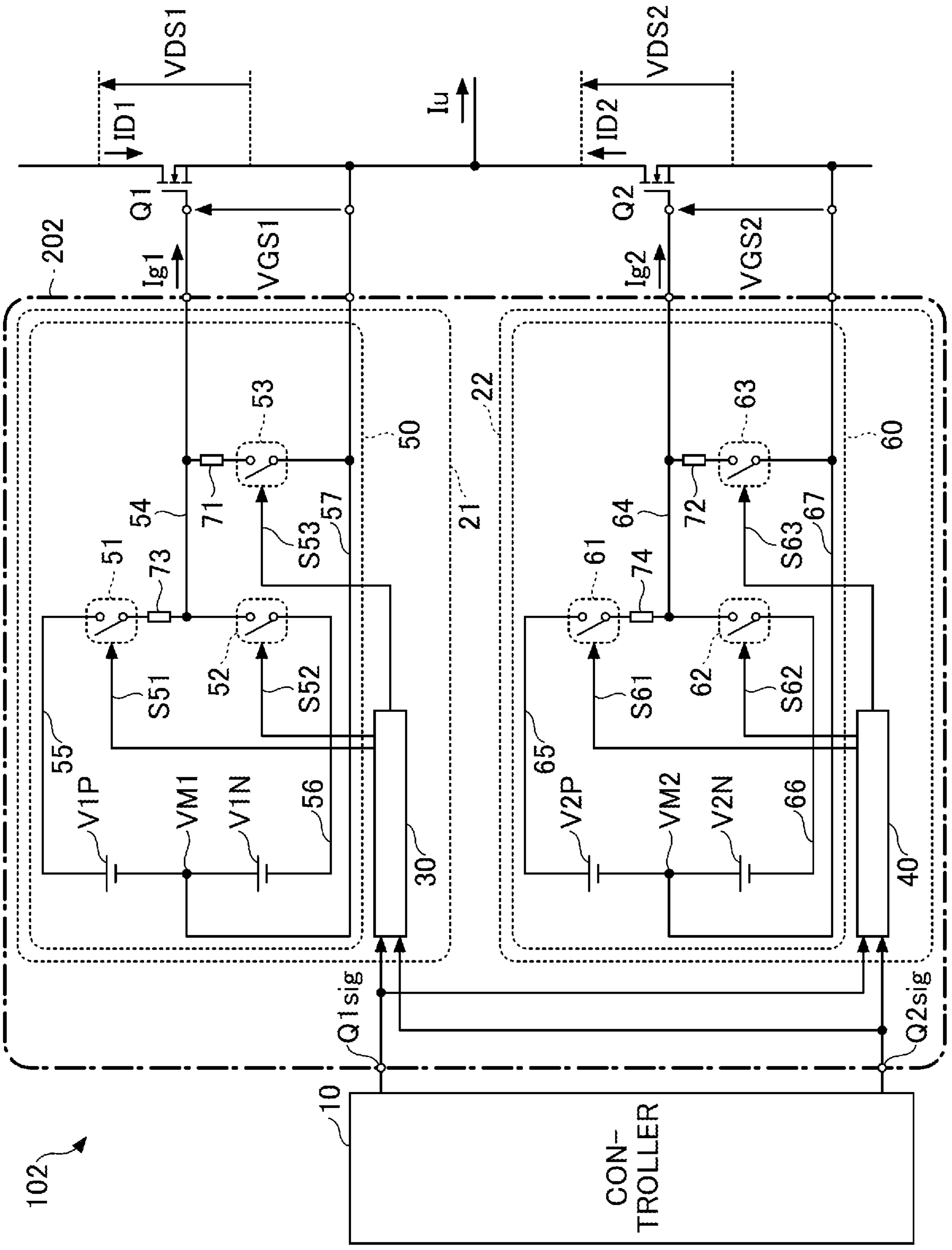
FIG. 9 is a diagram illustrating a configuration example of the power converter including the driving device according to a second embodiment.

FIG. 9 is a diagram illustrating a configuration example of the power converter including the driving device according to a second embodiment. In FIG. 9, a power converter 102 is an embodiment of the power converter 100, and a driving device 202 is an embodiment of the driving device 20. In the second embodiment, the description of the configurations, operations, and effects that are the same those of the embodiment described above will be omitted by referring to the description of the embodiment described above.

Depending on the characteristics of the switching elements and the circuits, it may be required to adjust operation speeds of the switching elements. In the second embodiment, the first drive circuit 21 includes a first resistive element 71 connected in series to the third switching circuit 53 in a path from the control electrode of the upper arm Q1 to the first reference line 57. In this example, the first resistive element 71 is connected in series to the third switching circuit 53, between the first control line 54 and the first reference line 57. Similarly, in the second embodiment, the second drive circuit 22 includes a second resistive element 72 connected in series to the sixth switching circuit 63 in a path from the control electrode of the lower arm Q2 to the second reference line 67. In this example, the second resistive element 72 is connected in series to the sixth switching circuit 63, between the second control line 64 and the second reference line 67.

The first drive circuit 21 may include a third resistive element 73 connected in series to the first switching circuit 51 in a path from the control electrode of the upper arm Q1 to the first positive power supply line 55. In this example, the third resistive element 73 is connected in series to the first switching circuit 51, between the first control line 54 and the first positive power supply line 55. Similarly, the second drive circuit 22 may include a fourth resistive element 74 connected in series to the fourth switching circuit 61 in a path from the control electrode of the lower arm Q2 to the second positive power supply line 65. In this example, the fourth resistive element 74 is connected in series to the fourth switching circuit 61, between the second control line 64 and the second positive power supply line 65.

The first resistive element 71 and the third resistive element 73 serve as a gate resistor of the upper arm Q1. More particularly, the operation speed of the upper arm Q1 when turning off the upper arm Q1 can be adjusted by adjusting the resistance value of the first resistive element 71. The operation speed of the upper arm Q1 when turning on the upper arm Q1 can be adjusted by adjusting the resistance value of the third resistive element 73. When the resistance value of the first resistive element 71 or the third resistive element 73 is adjusted to increase, the operation speed of the upper arm Q1 decreases, and when the resistance value of the first resistive element 71 or the third resistive element 73 is adjusted to decrease, the operation speed of the upper arm Q1 increases.

The second resistive element 72 and the fourth resistive element 74 serve as a gate resistor of the lower arm Q2. More particularly, the operation speed of the lower arm Q2 when turning off the lower arm Q2 can be adjusted by adjusting the resistance value of the second resistive element 72. The operation speed of the lower arm Q2 when turning on the lower arm Q2 can be adjusted by adjusting the resistance value of the fourth resistive element 74. When the resistance value of the second resistive element 72 or the fourth resistive element 73 is adjusted to increase, the operation speed of the lower arm Q2 decreases, and when the resistance value of the second resistive element 72 or the fourth resistive element 74 is adjusted to decrease, the operation speed of the lower arm Q2 increases.

According to the second embodiment, it is possible to obtain an effect of adjusting the operation speed of the switching element, in addition to obtaining the effect obtainable by the first embodiment.

It is possible to provide only one of the first resistive element 71 and the third resistive element 73, and it is possible to provide only one of the second resistive element 72 and the fourth resistive element 74.

A resistive element (not illustrated in FIG. 9) may be connected in series to the second switching circuit 52, between the first control line 54 and the first negative power supply line 56, but the resistive element that is not illustrated preferably has a resistance value smaller than the resistance value of the first resistive element 71, and the resistive element that is not illustrated may be omitted. The provision of the resistive element that is not illustrated increases a speed at which the gate voltage of the upper arm Q1 makes a transition between the first intermediate voltage VM1 and the first negative power supply voltage V1N, thereby reducing a dead time (a time that does not affect a behavior of the upper arm Q1). Further, because the control electrode of the upper arm Q1 and the first negative power supply voltage V1N are connected via a low resistance value, and it is possible to reduce variations in the gate voltage of the upper arm Q1 during a period in which the second switching circuit 52 is turned on, and prevent the upper arm Q1 from being erroneously turned on. The resistive element that is not illustrated may have a resistance value having such a resistance that prevents an overcurrent from flowing to the second switching circuit 52 or the control electrode of the upper arm Q1.

A resistive element (not illustrated in FIG. 9) may be connected in series to the fifth switching circuit 62, between the second control line 64 and the second negative power supply line 66, but the resistive element that is not illustrated preferably has a resistance value smaller than the resistance value of the second resistive element 72, and the resistive element that is not illustrated may be omitted. The provision of the resistive element that is not illustrated increases the speed at which the gate voltage of the lower arm Q2 makes a transition between the second intermediate voltage VM2 and the second negative power supply voltage V2N, thereby reducing a dead time (a time that does not affect a behavior of the lower arm Q2). Further, the control electrode of the lower arm Q2 and the second negative power supply voltage V2N are connected via a low resistance value, and it is possible to reduce variations in the gate voltage of the lower arm Q2 during a period in which the fifth switching circuit 62 is turned on, and prevent the lower arm Q2 from being erroneously turned on. The resistive element that is not illustrated may have a resistance value having such a resistance that prevents an overcurrent from flowing to the fifth switching circuit 62 or the control electrode of the lower arm Q2.

Figure 10:
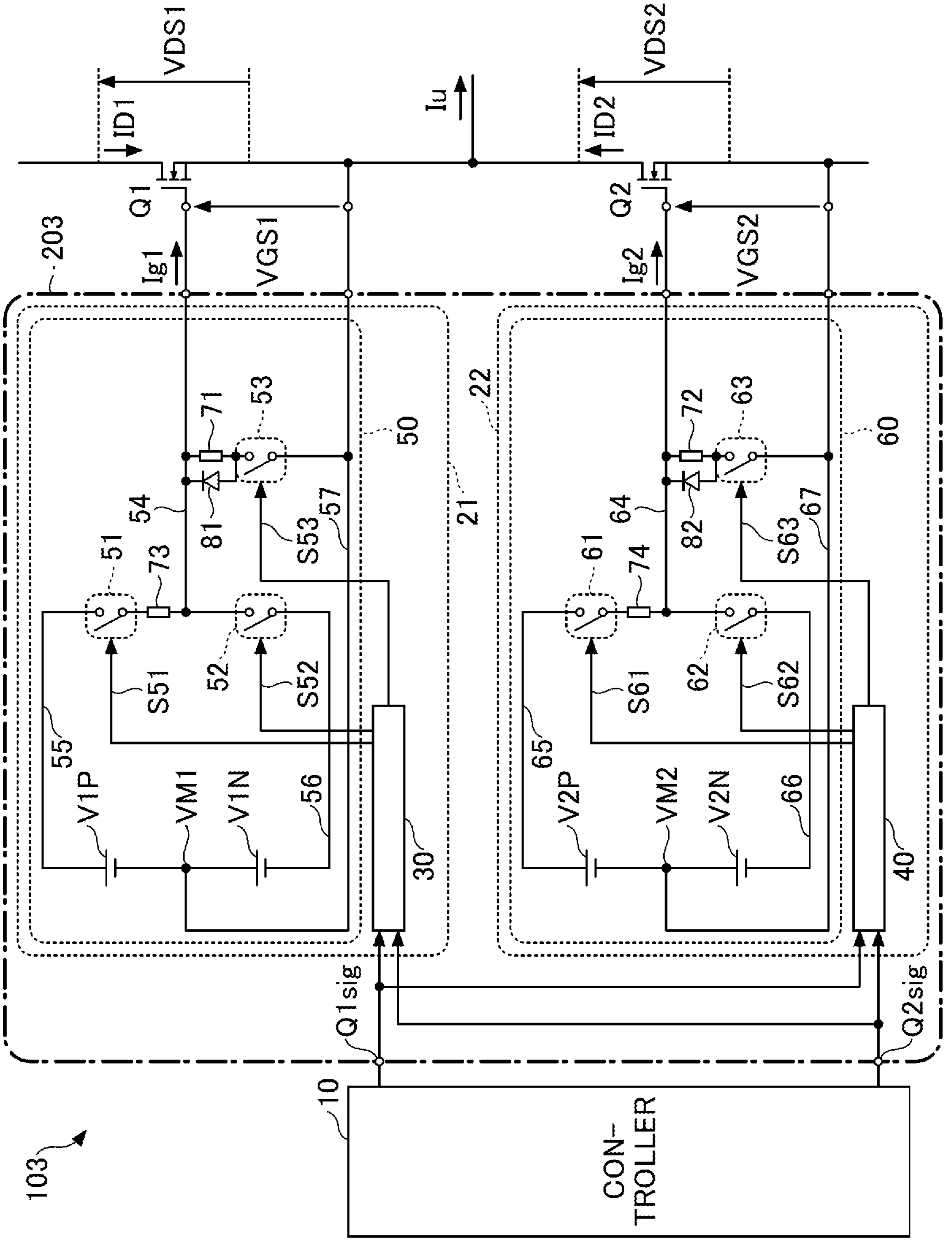
FIG. 10 is a diagram illustrating a configuration example of the power converter including the driving device according to a third embodiment.

FIG. 10 is a diagram illustrating a configuration example of the power converter including the driving device according to the third embodiment. In FIG. 10, a power converter 103 is an embodiment of the power converter 100, and a driving device 203 is an embodiment of the driving device 20. In the third embodiment, the description of the configurations, operations, and effects that are the same those of the embodiments described above will be omitted by referring to the description of the embodiments described above.

If a period tdon1 in which the gate-source voltage VGS1 changes from a reverse bias voltage (the first negative power supply voltage V1N) to a zero voltage (the first intermediate voltage VM1) illustrated in FIG. 6 and FIG. 8 is long, an operating frequency of the switching element becomes limited by the period tdon1, and the power conversion circuit may not satisfy design specifications. For this reason, there are cases where a long period tdon1 cannot be tolerated. For the same reasons, there are cases where a long period tdon2 in which the gate-source voltage VGS2 changes from a reverse bias voltage (the second negative power supply voltage V2N) to a zero voltage (second intermediate voltage VM2) cannot be tolerated.

In the third embodiment illustrated in FIG. 10, the first drive circuit 21 includes a first diode 81 connected in parallel to the first resistive element 71. The first diode 81 has an anode connected to one end of the first resistive element 71 closer to the first reference line 57, and a cathode connected to the other end of the first resistive element 71 closer to the first control line 54. By connecting the first diode 81, the period tdon1 in which the gate-source voltage VGS1 changes from the reverse bias voltage (the first negative power supply voltage V1N) to the zero voltage (the first intermediate voltage VM1) can be shortened while reducing the effects on the switching characteristics.

In the third embodiment illustrated in FIG. 10, the second drive circuit 22 includes a second diode 82 connected in parallel to the second resistive element 72. The second diode 82 has an anode connected to one end of the second resistive element 72 closer to the second reference line 67, and a cathode connected to the other end of the first resistive element 71 closer to the second control line 64. By connecting the second diode 82, the period tdon2 in which the gate-source voltage VGS2 changes from the reverse bias voltage (the second negative power supply voltage V2N) to the zero voltage (the second intermediate voltage VM2) can be shortened while reducing the effects on the switching characteristics.

The first diode 81 or the second diode 82 may be any element having a rectifying function, and may be an element other than a diode element (for example, a semiconductor switch, such as a MOSFET that is subjected to synchronous rectification control, or the like). In addition, only one of the first diode 81 and the second diode 82 may be provided.

Figure 11:
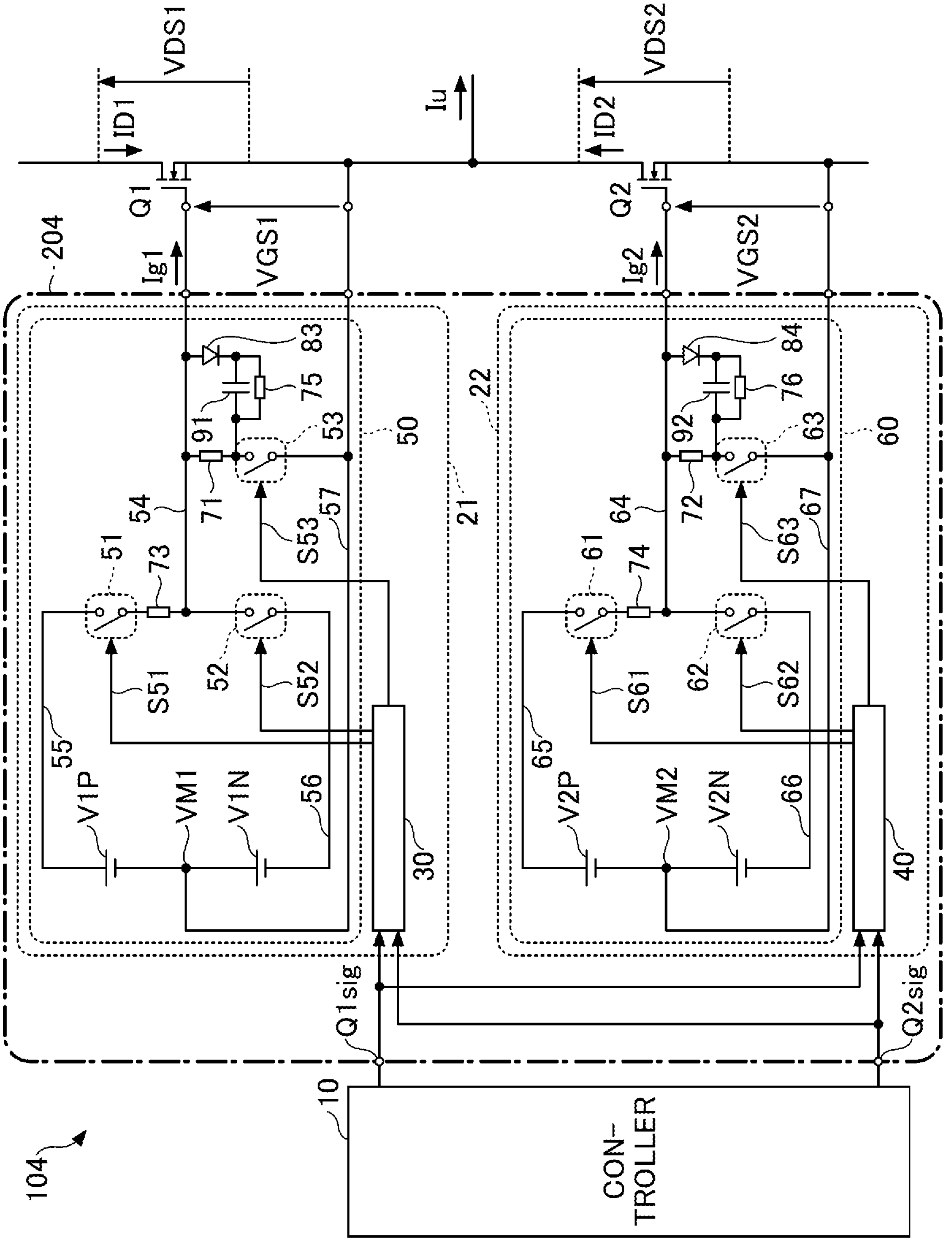
FIG. 11 is a diagram illustrating a configuration example of the power converter including the driving device according to a fourth embodiment.

FIG. 11 is a diagram illustrating a configuration example of the power converter including the driving device according to the fourth embodiment. In FIG. 11, a power converter 104 is an embodiment of the power converter 100, and a driving device 204 is an embodiment of the driving device 20. In the fourth embodiment, the description of the configurations, operations, and effects that are the same those of the embodiments described above will be omitted by referring to the description of the embodiments described above.

In the fourth embodiment, the first drive circuit 21 includes a first capacitor 91 connected in parallel to the first resistive element 71, a third diode 83 connected in series to the first capacitor 91, and a fifth resistive element 75 connected in parallel to the first capacitor 91. The third diode 83 has an anode electrically connected to the first control line 54, and a cathode electrically connected to one end of a parallel circuit formed by the first capacitor 91 and the fifth resistive element 75. Similarly, the second drive circuit 22 includes a second capacitor 92 connected in parallel to the second resistive element 72, a fourth diode 84 connected in series to the second capacitor 92, and a sixth resistive element 76 connected in parallel to the second capacitor 92. The fourth diode 84 has an anode electrically connected to the second control line 64, and a cathode electrically connected to one end of a parallel circuit formed by the second capacitor 92 and the sixth resistive element 76. The first drive circuit 21 may not necessarily include the first capacitor 91, the third diode 83, and the fifth resistive element 75, and the second drive circuit 22 may not necessarily include the second capacitor 92, the fourth diode 84, and the sixth resistive element 76.

Figure 12:
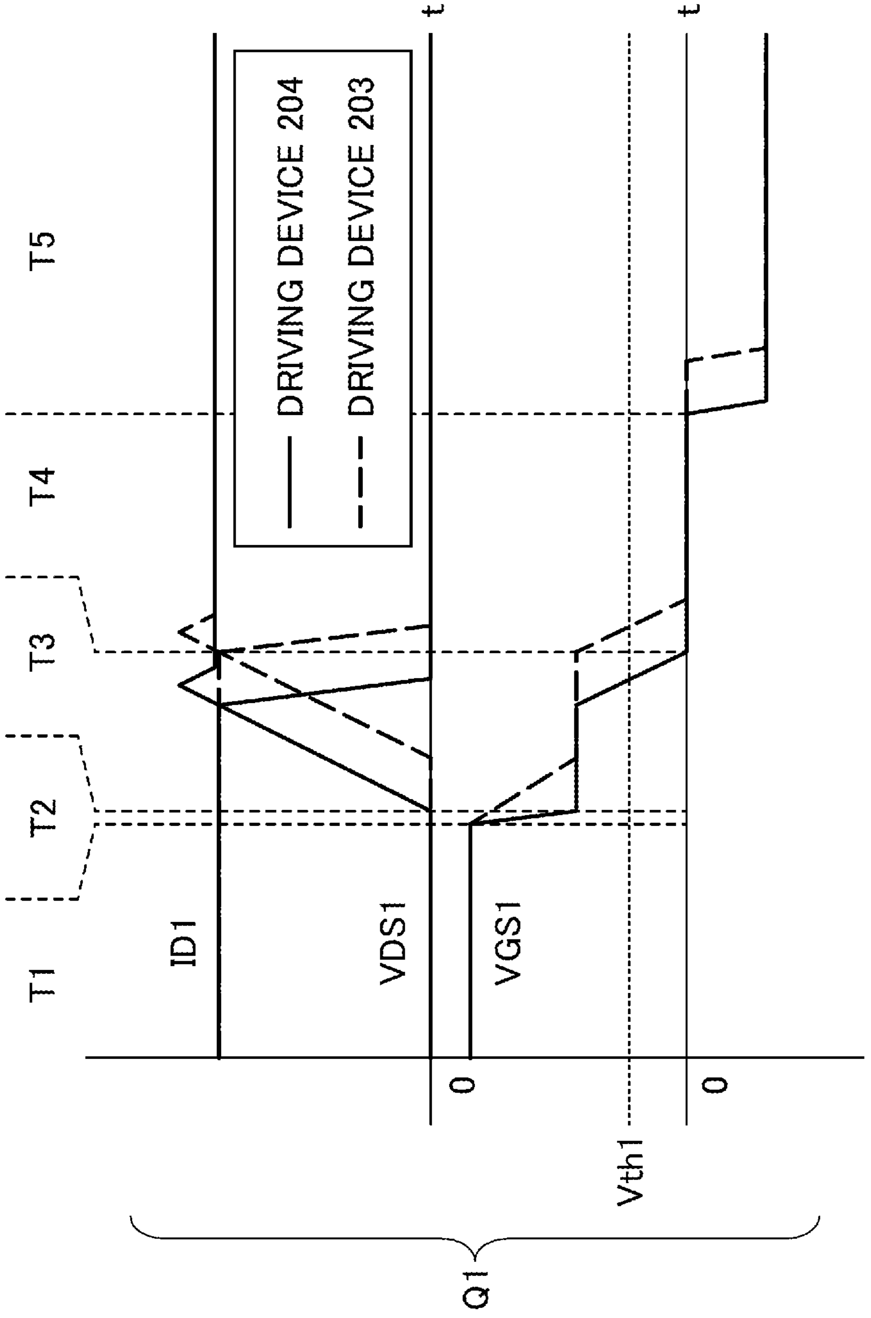
FIG. 12 is a timing chart illustrating an example of the operation of the driving device according to the fourth embodiment.

FIG. 12 is a timing chart illustrating an operation example of the driving device according to the fourth embodiment. The turn off operation of the upper arm Q1 in the fourth embodiment will be described with reference to FIG. 12.

During a period T1, the first switching circuit 51 assumes the on state, and the second switching circuit 52 and the third switching circuit 53 assume the off state. Accordingly, the voltage output from the first drive circuit 21 is the same as the first positive power supply voltage V1P, and the upper arm Q1 assumes the on state.

During a period T2, the third switching circuit 53 assumes the on state, and the first switching circuit 51 and the second switching circuit 52 assume the off state. Unlike the driving device 203 of the third embodiment, during the period T2, most of a gate current Ig1 flowing out from the upper arm Q1 passes through the first capacitor 91 via the third diode 83, without passing through the first resistive element 71. For this reason, the gate-source voltage VGS1 of the upper arm Q1 quickly decreases regardless of the size of the resistance value of the first resistive element 71, when compared to the second embodiment and the third embodiment.

During a period T3, the third switching circuit 53 assumes the on state, and the first switching circuit 51 and the second switching circuit 52 assume the off state, similar to the period T2. On the other hand, during the period T2, the first capacitor 91 is supplied with an electric charge by the gate current Ig1, and a capacitor voltage VC of the first capacitor 91 rises. However, during the period T3, the gate-source voltage VGS1 of the upper arm Q1 becomes lower than the capacitor voltage VC, and the third diode 83 performs a reverse blocking operation. By this reverse blocking operation, the first capacitor 91 is disconnected from the control electrode of the upper arm Q1, and is discharged by the fifth resistive element 75. Accordingly, a path through which the gate current Ig1 passes after the period T3 becomes only the path through the first resistive element 71. During this period T3, the switching operation of the upper arm Q1 is performed (in the case of the MOSFET, the drain-source voltage VDS1 or the drain current ID1 is varied).

During a period T4, the third switching circuit 53 assumes the on state, and the first switching circuit 51 and the second switching circuit 52 assume the off state, as in the period T3. This period T4 corresponds to a period included in the dead time DT1, and is the period in which the gate-source voltage VGS1 becomes substantially zero. Further, after the period T4, the upper arm Q1 assumes the off state. A timing at which the period T4 ends is identical to the timing at which the dead time DT1 ends when the upper arm Q1 performs the turn off operation.

During a period T5, the second switching circuit 52 assumes the on state, and the third switching circuit 53 and the first switching circuit 51 assume the off state.

Therefore, according to the first drive circuit 21 of the fourth embodiment, it is possible to shorten the delay time (a period tdoff1 (FIG. 6) and the period T2 (FIG. 12)) until the switching operation is started, without affecting the switching characteristics when the upper arm Q1 performs the turn off operation.

The description of FIG. 12 above will be applied to the turn off operation of the lower arm Q2 in the fourth embodiment. According to the second drive circuit 22 of the fourth embodiment, a delay time (a period tdoff2 (FIG. 6)) until the switching operation is started can be shortened, without affecting the switching characteristics when the lower arm Q2 performs the turn off operation.

Figure 13:
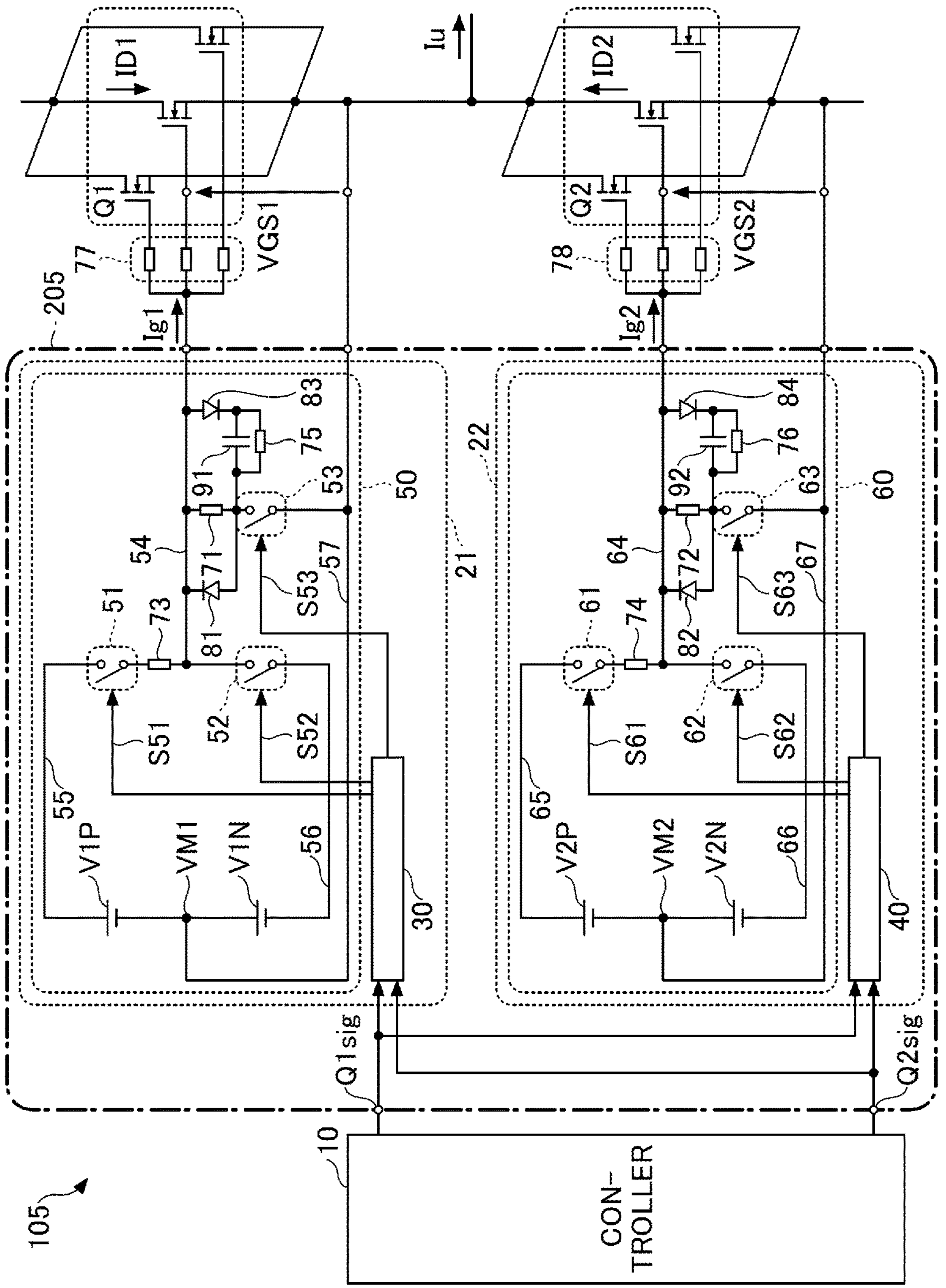
FIG. 13 is a timing chart illustrating an example of the operation of the driving device according to a fifth embodiment.

FIG. 13 is a diagram illustrating a configuration example of the power converter including the driving device according to a fifth embodiment. In FIG. 13, a power converter 105 is an embodiment of the power converter 100, and a driving device 205 is an embodiment of the driving device 20. In the fifth embodiment, the description of the configurations, operations, and effects that are the same those of the embodiments described above will be omitted by referring to the description of the embodiments described above.

FIG. 13 illustrates a case where the upper arm Q1 driven by one first drive circuit 21 is composed of a plurality of (three in this example) upper arm elements connected in parallel. FIG. 13 illustrates a case where the lower arm Q2 driven by one second drive circuit 22 is composed of a plurality of (three in this example) lower arm elements connected in parallel.

When a plurality of switching elements are connected to one drive circuit, electric oscillation may occur among the plurality of switching elements, and in a worst case, the elements may break down.

In the fifth embodiment, the power converter 105 includes a seventh resistive element 77 connected or inserted in series to the first control line 54, and an eighth resistive element 78 connected or inserted in series to the second control line 64. The seventh resistive element 77 is inserted in series in a path from the control electrode of the upper arm Q1 to an intermediate node between the first switching circuit 51 and the second switching circuit 52. The seventh resistive element 77 includes resistive elements inserted in series in a plurality of branch lines connecting a branch point of the first control line 54 and the control electrodes of the plurality of upper arm elements. The eighth resistive element 78 is inserted in series in a path from the control electrode of the lower arm Q2 to an intermediate node between the fourth switching circuit 61 and the fifth switching circuit 62. The eighth resistive element 78 includes resistive elements inserted in series in a plurality of branch lines connecting a branch point of the second control line 64 and the control electrodes of the plurality of lower arm elements. Only one of the seventh resistive element 77 and the eighth resistive element 78, that is, only the seventh resistive element 77 or only the eighth resistive element 78, may be provided.

By providing the seventh resistive element 77, the electric oscillation among the plurality of upper arm elements can be reduced, and the breakdown of the upper arm Q1 can be prevented. By providing the eighth resistive element 78, the electric oscillation among the plurality of lower arm elements can be reduced, and the breakdown of the lower arm Q2 can be prevented.

The number of parallel upper arm elements or the number of parallel lower arm elements is not limited to three, and the same effects are obtainable as long as the number of parallel arm elements is two or greater. The configuration in which the plurality of upper arm elements or the plurality of lower arm elements are connected in parallel, or the configuration in which the seventh resistive element 77 or the eighth resistive element 78 is additionally provided, can be applied to the configurations of the other embodiments including the first through fourth embodiments. In addition, the first drive circuit 21 and the second drive circuit 22 illustrated in FIG. 13 have a configuration in which the first through fourth embodiments are combined, but may have a configuration corresponding to one of the first through fourth embodiments, or a configuration corresponding to a combination of two or more embodiments among the first through fourth embodiments.

Figure 14:
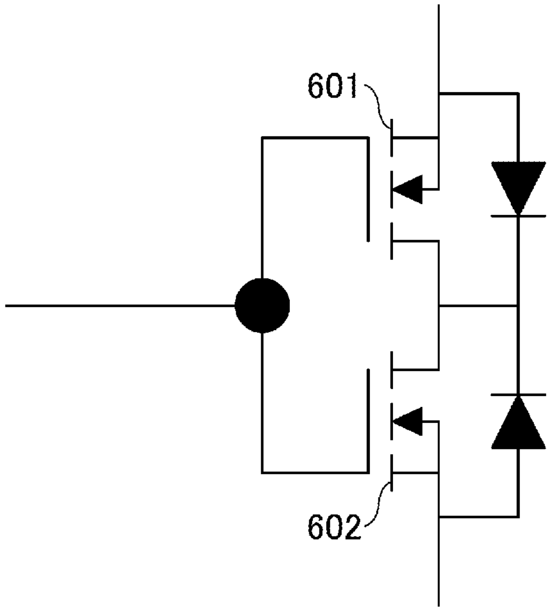
FIG. 14 is a diagram illustrating a configuration example of a third switching circuit or a sixth switching circuit.

FIG. 14 is a diagram illustrating a configuration example of the third switching circuit 53 or the sixth switching circuit 63. In the first through fifth embodiments, the third switching circuit 53 or the sixth switching circuit 63 may have a configuration including a bidirectional switch formed by a plurality of MOSFETs 601 and 602 and having a common drain terminal. The bidirectional switch is an element capable of allowing a current to flow in both directions between the first control line 54 and the first reference line 57, or between the second control line 64 and the second reference line 67. However, the third switching circuit 53 may have a configuration including a unidirectional switch that allows a current to flow only in one direction from the first control line 54 to the first reference line 57, and the sixth switching circuit 63 may have a configuration including a unidirectional switch that allows a current to flow only in one direction from the second control line 64 to the second reference line 67. The configuration of the third switching circuit 53 or the sixth switching circuit 63 is not limited to these configurations, and may be formed by combining various transistors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, alterations, and omissions could be made hereto without departing from the spirit and scope of the invention.

For example, the high-side drive circuit is not limited to the same configuration as the low-side drive circuit, and the high-side drive circuit and the low-side drive circuit may have different configurations.

In addition, in the embodiments described above, the driving device drives the elements of the two-level circuit in which the arm for one phase includes the upper arm Q1 and the lower arm Q2 connected in series. However, the technique of the present disclosure may be applied to a driving device that drives elements of a multilevel circuit having three or more output voltage levels.

With regard to the term "or" used in the present specification, a configuration including "A or B" may be a configuration including "at least one of A and B" or a configuration including "both of A and B". That is, the configuration including "A or B" may include "only A", or include "only B", or include "A and B".

According to the present disclosure, it is possible to prevent the deterioration of the switching element.

Although the embodiments are numbered with, for example, "first," "second," "third," "fourth," or "fifth," the ordinal numbers do not imply priorities of the embodiments. Many other variations and modifications will be apparent to those skilled in the art.

What is claimed is:

1. A driving device configured to alternately switch a first switching element and a second switching element that are coupled in series, with a dead time in between and during which the first switching element and the second switching element are simultaneously turned off, the driving device comprising:

- a first drive circuit configured to drive the first switching element; and
- a second drive circuit configured to drive the second switching element, wherein
- the first drive circuit includes:
  - a first control line electrically connected to a control electrode of the first switching element,
  - a first positive power supply line set to a first positive power supply voltage,
  - a first negative power supply line set to a first negative power supply voltage,
  - a first reference line electrically connected to a first main electrode of the first switching element, and set to a first intermediate voltage higher than the first negative power supply voltage and lower than a threshold voltage of the first switching element,
  - a first switching circuit configured to switch between electrically connecting and not electrically connecting the first control line to the first positive power supply line,
  - a second switching circuit configured to switch between electrically connecting or not electrically connecting the first control line to the first negative power supply line,
  - a third switching circuit configured to switch between electrically connecting and not electrically connecting the first control line to the first reference line, and
  - a first control circuit configured to operate the third switching circuit so that the first control line is electrically connected to the first reference line during the dead time, and
- the second drive circuit includes:
  - a second control line electrically connected to a control electrode of the second switching element,
  - a second positive power supply line set to a second positive power supply voltage,
  - a second negative power supply line set to a second negative power supply voltage,
  - a second reference line electrically connected to a first main electrode of the second switching element, and set to a second intermediate voltage higher than the second negative power supply voltage and lower than a threshold voltage of the second switching element,
  - a fourth switching circuit configured to switch between electrically connecting and not electrically connecting the second control line to the second positive power supply line,
  - a fifth switching circuit configured to switch between electrically connecting and not electrically connecting the second control line to the second negative power supply line,
  - a sixth switching circuit configured to switch between electrically connecting and not electrically connecting the second control line to the second reference line, and
  - a second control circuit configured to operate the sixth switching circuit so that the second control line is electrically connected to the second reference line.

2. The driving device as claimed in claim 1, wherein;

the first drive circuit includes a first resistive element coupled in series to the third switching circuit between the first control line and the first reference line, or the second drive circuit includes a second resistive element coupled in series to the sixth switching circuit between the second control line and the second reference line.

3. The driving device as claimed in claim 1, wherein:

the first drive circuit includes a third resistive element coupled in series to the first switching circuit between the first control line and the first positive power supply line, or the second drive circuit includes a fourth resistive element coupled in series to the fourth switching circuit between the second control line and the second positive power supply line.

4. The driving device as claimed in claim 2, wherein:

the first drive circuit includes a first diode coupled in parallel to the first resistive element in a case where the first drive circuit includes the first resistive element, or the second drive circuit includes a second diode coupled in parallel to the second resistive element in a case where the second drive circuit includes the second resistive element.

5. The driving device as claimed in claim 2, wherein:

in a case where the first drive circuit includes the first resistive element, the first drive circuit includes:

a first capacitor coupled in parallel to the first resistive element, a third diode coupled in series to the first capacitor, and a fifth resistive element coupled in parallel to the first capacitor, or in a case where the second drive circuit includes the second resistive element, the second drive circuit includes:

a second capacitor coupled in parallel to the second resistive element, a fourth diode coupled in series to the second capacitor, and a sixth resistive element coupled in parallel to the second capacitor.

6. The driving device as claimed in claim 1, wherein the first switching circuit and the second switching circuit include a bidirectional switch.

7. A power converter comprising:

the driving device according to claim 1;

the first switching element; and the second switching element.

8. The power converter as claimed in claim 7, further comprising:

a seventh resistive element coupled to or inserted in series in the first control line; or an eighth resistive element coupled to or inserted in series in the second control line.

9. The power converter as claimed in claim 7, wherein the first switching element and the second switching element are elements formed of a wide bandgap semiconductor.

10. The driving device as claimed in claim 1, wherein the first reference line receives the first intermediate voltage from circuitry other than the first positive power supply line and the first negative power supply line.

11. The driving device as claimed in claim 1, wherein the first control circuit controls the third switching circuit to electrically connect the first control line to the first reference line only during the dead time, and not to electrically connect the first control line to the first reference line when the first switching element is turned on or off during a time other than the dead time.

12. The driving device as claimed in claim 1, wherein:

the first control circuit controls the third switching circuit to electrically connect the first control line to the first reference line during the dead time, such that the first switching circuit, the second switching circuit, and the third switching circuit selectively apply three different voltages to the control electrode of the first switching element including the first positive power supply voltage, the first negative power supply voltage, and the first intermediate voltage, to apply the first intermediate voltage to the control electrode of the first switching element during the dead time, and the second control circuit controls the sixth switching circuit to electrically connect the second control line to the second reference line during the dead time, to apply the second intermediate voltage to the control electrode of the second switching element during the dead time.

* * * * *